US010640630B2

(12) United States Patent
Belmont et al.

(10) Patent No.: US 10,640,630 B2
(45) Date of Patent: *May 5, 2020

(54) ELASTOMERIC COMPOSITES CONTAINING MODIFIED FILLERS AND FUNCTIONALIZED ELASTOMERS

(75) Inventors: James A. Belmont, Acton, MA (US); Vijay R. Tirumala, Waltham, MA (US); Ping Zhang, Westford, MA (US)

(73) Assignee: Cabot Corporation, Boston, MA (US)

( * ) Notice: Subject to any disclaimer, the term of this patent is extended or adjusted under 35 U.S.C. 154(b) by 822 days.

This patent is subject to a terminal disclaimer.

(21) Appl. No.: 14/381,612

(22) PCT Filed: Mar. 2, 2012

(86) PCT No.: PCT/US2012/027472
§ 371 (c)(1),
(2), (4) Date: Mar. 18, 2015

(87) PCT Pub. No.: WO2013/130099
PCT Pub. Date: Sep. 6, 2013

(65) Prior Publication Data
US 2015/0183962 A1 Jul. 2, 2015

(51) Int. Cl.
*C08K 9/04* (2006.01)
*B60C 1/00* (2006.01)
*C08K 9/12* (2006.01)
*C09C 1/48* (2006.01)

(52) U.S. Cl.
CPC .............. *C08K 9/04* (2013.01); *B60C 1/0016* (2013.01); *B60C 1/0025* (2013.01); *C08K 9/12* (2013.01); *C09C 1/48* (2013.01)

(58) Field of Classification Search
CPC ................ C08K 9/04; C08K 9/12; C09C 1/48
See application file for complete search history.

(56) References Cited

U.S. PATENT DOCUMENTS

| | | |
|---|---|---|
| 3,048,559 A | 8/1962 | Heller et al. |
| 4,029,633 A | 6/1977 | Hagopian et al. |
| 4,169,112 A | 9/1979 | Elmer et al. |
| 4,234,705 A | 11/1980 | Matoba |
| 4,271,213 A | 6/1981 | Grimm et al. |
| 4,995,197 A | 2/1991 | Shieh et al. |
| 5,243,047 A | 9/1993 | Lawson |
| 5,270,364 A | 12/1993 | Schwartz et al. |
| 5,554,739 A | 9/1996 | Belmont |
| 5,559,169 A | 9/1996 | Belmont et al. |
| 5,707,432 A | 1/1998 | Adams et al. |
| 5,753,742 A | 5/1998 | Bumanlag |
| 5,763,388 A | 6/1998 | Lightsey et al. |
| 5,780,537 A * | 7/1998 | Smith ................... B60C 1/0016 152/905 |
| 5,830,930 A | 11/1998 | Mahmud et al. |
| 5,837,045 A | 11/1998 | Johnson et al. |
| 5,851,280 A | 12/1998 | Belmont et al. |
| 5,859,120 A | 1/1999 | Karl et al. |
| 5,877,238 A | 3/1999 | Mahmud et al. |
| 5,885,335 A | 3/1999 | Adams et al. |
| 5,895,522 A | 4/1999 | Belmont et al. |
| 5,900,029 A | 5/1999 | Belmont et al. |
| 5,922,118 A | 7/1999 | Johnson et al. |
| 6,014,998 A | 1/2000 | Mowdood et al. |
| 6,028,137 A | 2/2000 | Mahmud et al. |
| 6,042,643 A | 3/2000 | Belmont et al. |
| 6,048,923 A | 4/2000 | Mabry et al. |
| 6,197,274 B1 | 3/2001 | Mahmud et al. |
| 6,290,767 B1 | 9/2001 | Bergemann et al. |
| 6,323,273 B1 | 11/2001 | Mahmud et al. |
| 6,398,858 B1 | 6/2002 | Yu et al. |
| 6,403,713 B2 | 6/2002 | Onizawa |
| 6,471,763 B1 | 10/2002 | Karl |
| 6,494,946 B1 | 12/2002 | Belmont et al. |
| 6,521,691 B1 | 2/2003 | Agostini et al. |
| 6,660,075 B2 | 12/2003 | Bergemann et al. |
| 6,723,783 B2 | 4/2004 | Palumbo et al. |
| 6,740,151 B2 | 5/2004 | Belmont et al. |
| 6,758,891 B2 | 7/2004 | Bergemann et al. |
| 6,780,389 B2 | 8/2004 | Karl et al. |
| 6,831,194 B2 | 12/2004 | Srinivas |
| 6,908,960 B2 | 6/2005 | Takaya et al. |
| 6,929,783 B2 | 8/2005 | Chung et al. |
| 6,960,250 B2 | 11/2005 | Luethge et al. |

(Continued)

FOREIGN PATENT DOCUMENTS

| | | |
|---|---|---|
| CA | 2351162 A1 | 12/2001 |
| EP | 0964028 A1 | 12/1999 |

(Continued)

OTHER PUBLICATIONS

Antonijevic et al., "Copper Corrosion Inhibitors. A review," Int. J. Electrochem. Sci., vol. 3 (2008) pp. 1-28.
Chino et al., "Theremoreversible Crosslinking Rubber Using Supramolecular Hydrogen Bonding Networks," Rubber Chemistry and Technology, vol. 75, pp. 713-724.
International Search Report and Written Opinion issued in corresponding International Patent Application No. PCT/US2012/027472 dated Jan. 2, 2013 (9 pages).
Office Action received in corresponding Japanese Patent Application No. JP2014-559874 dated Jul. 7, 2015 (English translation only) (2 pages).
Search Report received in corresponding Spanish Patent Application No. 201390027 dated Mar. 13, 2015 (4 pages).
Search Report received in corresponding Chinese Patent Application No. 201280072927.5 dated Jan. 13, 2016 (English translation only) (2 pages).

(Continued)

*Primary Examiner* — Vickey Nerangis

(57) ABSTRACT

Elastomeric compositions are described which have at least one functionalized elastomer and at least one modified filler which has adsorbed and/or attached chemical groups, such as a triazole and/or pyrazole thereon, or other modified fillers which are also described. Methods are further described to improve hysteresis and/or abrasion resistance in elastomeric compositions containing a functionalized elastomer using the modified fillers of the present invention.

45 Claims, No Drawings

(56) References Cited

U.S. PATENT DOCUMENTS

| | | |
|---|---|---|
| 7,175,946 B2 | 2/2007 | Step et al. |
| 7,217,405 B2 | 5/2007 | Karl |
| 7,294,185 B2 | 11/2007 | Belmont et al. |
| 7,300,964 B2 | 11/2007 | Niedermeier et al. |
| 7,396,870 B2 * | 7/2008 | Robert .................. B60C 1/0016 524/262 |
| 7,836,928 B2 | 11/2010 | Hogan et al. |
| 7,902,278 B2 | 3/2011 | Hogan et al. |
| 7,928,159 B2 | 4/2011 | Yan |
| 8,975,316 B2 * | 3/2015 | Belmont .................. C08K 9/12 524/105 |
| 2001/0036994 A1 | 11/2001 | Bergemann et al. |
| 2002/0011185 A1 | 1/2002 | Belmont |
| 2002/0020318 A1 | 2/2002 | Galloway et al. |
| 2003/0101901 A1 | 6/2003 | Bergemann et al. |
| 2003/0129529 A1 | 7/2003 | Step et al. |
| 2005/0034629 A1 | 2/2005 | Belmont et al. |
| 2005/0085568 A1 | 4/2005 | Nishitani |
| 2005/0247237 A1 | 11/2005 | Schukat et al. |
| 2006/0084751 A1 | 4/2006 | Step et al. |
| 2006/0094829 A1 | 5/2006 | Chino et al. |
| 2008/0146745 A1 | 6/2008 | Luo et al. |
| 2008/0159947 A1 | 7/2008 | Yurovskaya et al. |
| 2010/0160530 A1 | 6/2010 | Kurazumi et al. |
| 2011/0077343 A1 | 3/2011 | Ishikawa et al. |
| 2013/0123418 A1 | 5/2013 | Araujo Da silva et al. |
| 2013/0165560 A1 | 6/2013 | Belmont et al. |
| 2013/0231423 A1 | 9/2013 | Rumpf et al. |

FOREIGN PATENT DOCUMENTS

| | | |
|---|---|---|
| EP | 0990676 A1 | 4/2000 |
| EP | 1148091 A2 | 10/2001 |
| EP | 1394221 A1 | 3/2004 |
| EP | 1695987 A1 | 8/2006 |
| EP | 1136526 B1 | 1/2008 |
| EP | 2289990 A1 | 3/2011 |
| EP | 2329964 A1 | 6/2011 |
| JP | 62-273267 A | 11/1987 |
| JP | 2011-89031 A | 5/2011 |
| RU | 2008134106 A | 2/2010 |
| RU | 2009139923 A | 5/2011 |
| WO | 2004063289 A2 | 7/2004 |
| WO | 2007039416 A1 | 4/2007 |
| WO | WO 08/119465 A1 | 10/2008 |
| WO | 2010006889 A2 | 1/2010 |
| WO | 2011028337 A2 | 3/2011 |
| WO | 2012007442 A1 | 1/2012 |
| WO | 2012031183 A2 | 3/2012 |

OTHER PUBLICATIONS

Office Action received in corresponding Chinese Patent Application No. 201280072927.5 dated Jan. 12, 2017 (48 pages)(translation only).

* cited by examiner

ELASTOMERIC COMPOSITES CONTAINING MODIFIED FILLERS AND FUNCTIONALIZED ELASTOMERS

This application is a National Stage Application of PCT/US2012/027472, filed on Mar. 2, 2012.

BACKGROUND OF THE INVENTION

The present invention relates to fillers, elastomeric compositions or composites, and methods to make the same, and methods to improve one or more properties in elastomeric compositions. More specifically, the present invention relates to modified fillers and the use of these fillers in elastomeric compositions.

Carbon blacks and other fillers have been utilized as pigments, fillers, and/or reinforcing agents in the compounding and preparation of compositions used in rubber, plastic, paper or textile applications. The properties of the carbon black or other fillers are important factors in determining various performance characteristics of these compositions.

Much effort has been expended over the last several decades to modify the surface chemistry of carbon black. Useful processes for attaching an organic group to carbon black and uses of the resulting product are described, for example, in U.S. Pat. Nos. 5,559,169; 5,900,029; 5,851,280; 6,042,643; 6,494,946; 6,740,151; and 7,294,185, all of which are incorporated herein by reference in their entirety. U.S. Pat. No. 5,559,169, for example, discloses a carbon black product having an attached organic group of the formula —Ar—$S_n$, —Ar'— or —Ar—$S_n$—Ar"— (where Ar and Ar' are arylene groups, Ar" is an aryl group and n is 1 to 8) that can be employed in ethylene-propylene-diene monomers (EPDM), partially hydrogenated copolymer of acrylonitrile and butadiene (HNBR), or butyl rubber compositions.

Important uses of elastomeric compositions relate to the manufacture of tires and additional ingredients often are added to impart specific properties to the finished product or its components. U.S. Pat. No. 6,014,998, for example, describes the use of benzotriazole or tolyltriazole to improve cure rates, cure efficiency, hardness, static and dynamic moduli, without adversely affecting hysteresis in silica-reinforced rubber compositions for tire components. These compositions include from about 2 to about 35 parts triazoles (preferably from about 2 to about 6 parts triazoles) per hundred parts of rubber. In some cases, brass powder and conductive carbon black are also added and the compositions are mixed by conventional means in one or multiple steps.

U.S. Pat. No. 6,758,891 relates to the treatment of carbon black, graphite powder, graphite fibers, carbon fibers, carbon fibrils, carbon nanotubes, carbon fabrics, glass-like carbon products and active carbon by the reaction with triazene modifying agents. The resulting carbon can be used in rubber, plastics, printing inks, inks, inkjet inks, lacquers, toners and colorants, bitumen, concrete, other constructional materials, and paper.

As indicated above, fillers can provide reinforcing benefits to a variety of materials, including elastomeric compositions. Besides the conventional filler attributes, there is a desire to provide fillers which can improve one or more elastomeric properties, especially hysteresis and/or abrasion resistance. However, in the past, with some elastomeric compositions using fillers, a filler can typically improve one property, but to the detriment of the other property. For instance, while hysteresis may improve, abrasion resistance can decrease or have no improvement. Thus, there is a need to provide fillers which preferably can enhance one of these properties without any significant detriment to the other. Even more preferable would be a filler that can improve both properties, namely improve hysteresis and improve abrasion resistance.

SUMMARY OF THE PRESENT INVENTION

A feature of the present invention is to provide new classes of fillers that promote one or more beneficial properties.

A further feature of the present invention is to provide fillers which can have the ability to improve hysteresis in elastomeric compositions when present.

An additional feature of the present invention is to provide a filler that can have the ability to improve abrasion resistance in an elastomeric composition when present.

A further feature of the present invention is to provide methods to achieve a balance of properties with respect to hysteresis and abrasion resistance in elastomeric compositions.

Additional features and advantages of the present invention will be set forth in part in the description that follows, and in part will be apparent from the description, or may be learned by practice of the present invention. The features and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a modified filler, such as a modified carbon black, modified metal oxide, a modified filler having a carbon phase and a silicon-containing species phase, and the like. The modified filler can be a filler having adsorbed thereon at least one triazole, or at least one pyrazole, or any combinations thereof. More specific formulas and examples are provided.

This modified filler can optionally have attached at least one chemical group, such as an organic group, for instance, an organic group comprising at least one alkyl group and/or aromatic group. The alkyl group and/or aromatic group can be directly attached to the filler. The chemical group can be the same or similar or different to the group that is adsorbed onto the filler. The chemical group attached can be or include at least one triazole, or at least one pyrazole, or at least one imidazole, or any combinations thereof.

The present invention also relates to a modified filler, such as a modified carbon black or modified metal oxide or the like, having attached thereon at least one triazole.

The present invention further relates to elastomeric compositions containing any one or more of the modified fillers of the present invention and at least one functionalized elastomer, and methods to make the same.

The present invention further relates to articles made from or containing one or more modified fillers of the present invention and/or one or more elastomeric compositions or polymeric compositions of the present invention, such as a tire or part thereof, and other elastomeric and/or polymeric articles.

The present invention further relates to a method to improve hysteresis and/or abrasion resistance in an elastomeric composition, such as a tire or part thereof, by incorporating one or more modified fillers of the present invention into an elastomeric composition.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to modified fillers, elastomeric compositions containing the modified fillers and functionalized elastomer, articles made from or containing the modified fillers or elastomeric or other polymeric compositions, methods to make the same, and methods of improving elastomeric properties including, but not limited to, hysteresis and/or abrasion resistance.

In more detail, the present invention relates, in part, to a modified filler that is or includes a filler having adsorbed thereon: (a) at least one triazole, such as 1,2,4 triazole; (b) at least one pyrazole; or any combinations thereof. The modified filler preferably improves abrasion resistance when present in an elastomeric composition compared to the same filler that is not modified (i.e., compared to an untreated or unmodified filler). The elastomeric composition used to confirm this test parameter can be one of the elastomeric compositions used in the Examples.

The present invention also relates, in part, to a modified filler that is or includes a filler having adsorbed thereon:

a) at least one triazole, such as at least one 1,2,4 triazole, having a sulfur-containing or poly-sulfur containing substituent, in the presence of or absence of any other aromatic group; or b) at least one pyrazole having a sulfur-containing substituent in the presence of or absence of any other aromatic group, or any combinations thereof. Again, preferably, the modified filler improves abrasion resistance when present in an elastomeric composition compared to the filler that is not modified. Again, to confirm this test property, one of the elastomeric compositions used in the Examples can be used.

For purposes of the present invention, the adsorbing of (a) and/or (b) means that the adsorbed chemical group is not chemically attached onto the surface of the filler and can be removed from the surface by a solvent extraction, such as a Soxhlet extraction. For example, a chemical group that is adsorbed onto the filler can be removed by Soxhlet extraction that can occur for 16-18 hours in methanol or ethanol, wherein the extraction removes all, or nearly or substantially all, of the chemical group. The extraction can be repeated one or more times. It is possible that a residual of the adsorbed group can remain on the surface of the filler. For purposes of the present invention, the extraction by solvent, as described herein, can remove at least 80 wt % of the adsorbed chemical group and, generally, at least 90% or at least 95% by weight of the adsorbed chemical group. This determination can be made by an elemental analysis of extracted and unextracted samples.

For purposes of the present invention, the triazole includes a chemical group that has a triazole-containing group. The triazole can be a 1,2,4 triazole or a 1,2,3 triazole. The triazole can be a thiol or polysulfide-containing polytriazole. 1,2,4 triazole or 1,2,4 triazole-containing groups are preferred as adsorbed chemical groups. Examples of the triazole include a triazole having the formula (or tautomers thereof):

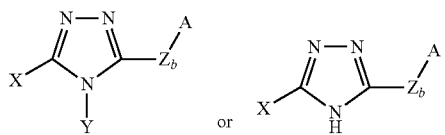

or a triazole (or tautomers thereof) having the formula:

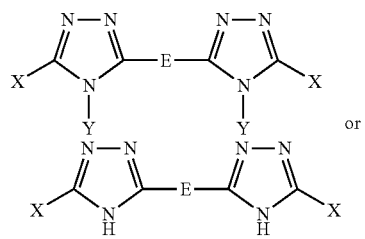

wherein $Z_b$ is an alkylene group (e.g., $C_1$-$C_4$ alkylene), wherein b is 0 or 1;

X, which is the same or different, is H, $NH_2$, SH, $NHNH_2$, CHO, COOR, COOH, $CONR_2$, CN, $CH_3$, OH, NDD', or $CF_3$;

Y is H, or $NH_2$;

A is a functional group and can be or comprise $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of the functional groups;

where R and R', which can be the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8; and

Q is $(CH_2)_w$, $(CH2)_xO(CH_2)_z$, $(CH_2)_xNR(CH_2)_z$, or $(CH_2)_x S(CH_2)_z$, where x is 1 to 6, z is 1 to 6, and w is 2 to 6. $S_kR$ can be $S_kH$. For $S_kR$, when R is not H, k is 2 to 8, and when R is H, k is 1 to 8;

E is a polysulfur-containing group, such as $S_w$ (where w is 2 to 8), SSO, $SSO_2$, $SOSO_2$, $SO_2SO_2$; and the triazole can optionally be N– substituted with an NDD' substituent, where D and D', which are the same or different, are H or $C_1$-$C_4$ alkyl.

More specific examples of the triazole include, but are not limited to, 3-amino-1,2,4-triazole-5-thiol, 3-amino-1,2,4-triazole-5-yl-disulfide; 1,2,4-triazole-3-thiol; 1,2,4-triazole-3-yl-disulfide; 3-amino-1,2,4-triazole-5-yl-trisulfide; 4-amino-3-hydrazino-1,2,4-triazole-5-thiol, and the like.

For purposes of the present invention, the pyrazole includes a chemical that has a pyrazole-containing group. The pyrazole can be a thiol or polysulfide-containing polypyrazole. Examples of the pyrazole can include a pyrazole having the formula (or tautomers thereof):

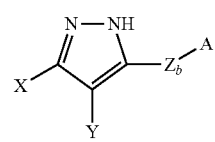

or a pyrazole having the formula (or tautomers thereof):

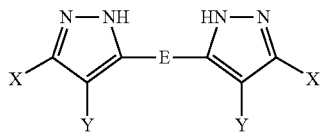

wherein $Z_b$ is an alkylene group (e.g., $C_1$-$C_4$ alkylene group), wherein b is 0 or 1;

X and Y are independently H, $NH_2$, SH, $NHNH_2$, CHO, COOR, COOH, $CONR_2$, CN, $CH_3$, OH, NDD', or $CF_3$, or Y can be R, where each X and Y are the same or different;

A is a functional group and can be or comprise $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of the functional group(s);

where R and R', which can be the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene; k is an integer from 1 to 8; and Q is $(CH_2)_w$, $(CH2)_xO(CH_2)_z$, $(CH_2)_xNR(CH_2)_z$, or $(CH_2)_xS(CH_2)_z$, where x is 1 to 6, z is 1 to 6, and w is 2 to 6. $S_kR$ can be $S_kH$. For $S_kR$, when R is not H, k is 2 to 8, and when R is H, k is 1 to 8. E is a polysulfur-containing group, such as $S_w$ (where w is 2 to 8), SSO, $SSO_2$, $SOSO_2$, or $SO_2SO_2$, and D and D', which are the same or different, are H or $C_1$-$C_4$ alkyl.

More specific examples of the pyrazole include, but are not limited to, pyrazole-3-thiol, pyrazol-3-yl disulfide, and/or 3-methyl-pyrazole-5-thiol.

For any of the formulas set forth herein, with regard to the substituent A, more specific examples include, but are not limited to, SH; SSAr, where Ar is a triazole or a pyrazole, or SSAr where Ar is a different heterocycle.

As stated, the chemical groups adsorbed onto the filler or surface of the filler to create this type of the modified filler can be a single chemical group, or two or more different types of chemical groups. One or more different types of triazoles can be present and/or one or more different types of pyrazoles can be present, or any combinations, such as one or more triazoles, with one or more pyrazoles, and the like. In addition, as an option, other chemical groups, other than the triazole and/or pyrazole, can also additionally be present on the filler as an adsorbed chemical group.

The adsorbed chemical group can be entirely or substantially entirely on the surface area of the exposed surface of the filler to form the modified filler or can be a lesser amount. For instance, the adsorbed chemical group can comprise at least 5% of the surface area of the filler surface, at least 10%, at least 20%, at least 30%, at least 40%, at least 50%, at least 60%, at least 70%, at least 80%, at least 90%, at least 95%, at least 97%, at least 99%, or about 100%, or 100% of the surface area on the surface of the filler.

The amount of adsorbed chemical group(s) can be any amount on the filler. For example, the total amount of the adsorbed chemical group can be from about 0.01 to about 10 micromoles of heterocyclic groups/$m^2$ surface area of filler, as measured by nitrogen adsorption (BET method), including from about 1 to about 8 micromoles/$m^2$, from about 2 to about 6 micromoles/$m^2$, or from about 3 to about 5 micromoles/$m^2$.

The filler that receives the adsorbed chemical group(s) and/or the attached chemical group, as described herein, can be any conventional filler. The filler is a particulate filler. For example, the filler can be one or more types of carbon black, one or more types of metal oxides or metal containing fillers (e.g., an oxide or filler of or containing silicon, magnesium, calcium, titanium, vanadium, cobalt, nickel, zirconium, tin, antimony, chromium, neodymium, lead, barium, cesium, and/or molybdenum), or one or more types of other carbon-containing fillers, such as a multi-phase aggregate comprising at least one carbon phase and at least one metal-containing species phase or silicon-containing species phase (also known as silicon-treated carbon black). The filler can be a silica-coated carbon black, an oxidized carbon black, a sulfonated carbon black, or a filler having attached one or more chemical groups, such as organic groups. With respect to the carbon black, the carbon black can be any ASTM-type carbon black, such as an ASTM-100 to ASTM-1000 type carbon black. The filler can be one or more types of reinforcing-grade fillers, tire-grade fillers, or rubber-grade fillers, such as tire-grade carbon blacks or rubber-grade carbon blacks. Other examples of fillers include calcium carbonate, clay, talc, silicates, and the like.

The filler can be any carbon-containing filler, such as fibers, nanotubes, graphenes, and the like.

The filler or reinforcing agent, such as carbon black, can be any commercially-available carbon black and/or silica, such as those provided by Cabot Corporation, Degussa or Evonik Corporation, and the like. There is no criticality whatsoever to the type of carbon black, silica, or other filler that can be used to form the modified filler(s) of the present invention. Thus, the fillers, such as carbon black and/or silica can have any physical, analytical, and/or morphological properties. Examples of suitable carbon blacks include those listed herein, as well as non-conductive or conductive furnace blacks, Cabot's Black Pearls® carbon blacks, Cabot's Vulcan® carbon blacks, Cabot's Sterling® carbon blacks, Cabot's Regal® carbon blacks, Cabot's Spheron® carbon blacks, Cabot's Monarch® carbon blacks, Cabot's Elftex® carbon blacks, Cabot's Emperor® carbon blacks, Cabot's IRX™ carbon blacks, Cabot's Mogul® carbon blacks, Cabot's CRX™ carbon blacks, Cabot's CSX™ carbon blacks, Cabot's Ecoblack™ carbon blacks, Degussa's CK-3 carbon black, Degussa's Corax® carbon blacks, Degussa's Durex® carbon blacks, Degussa's Ecorax carbon blacks, Degussa's Printex® carbon blacks, Degussa's Purex® carbon blacks. Other examples include lamp blacks, carbon black having attached chemical group(s), such as an organic group, silicon-treated carbon blacks, metal-treated carbon blacks, silica-coated carbon blacks, chemically-treated (e.g., surfactant-treated) carbon black, and any grades of carbon black or silica.

The carbon black can have one or more of the following properties. The CTAB surface area may be 10 $m^2$/g to 400 $m^2$/g, such as 20 $m^2$/g to 250 $m^2$/g or 50 $m^2$/g to 150 $m^2$/g. The Iodine number can be 10 $m^2$/g to 1000 $m^2$/g, 20 $m^2$/g to 400 $m^2$/g, or 20 to 300 $m^2$/g or 50 $m^2$/g and 150 $m^2$/g. The DBPA can be 20 mL/100 g to 300 mL/100 g, such as 30 mL/100 g to 200 mL/100 g or 50 mL/100 g to 150 mL/100 g. Many suitable carbon black starting materials are available commercially. Representative examples of commercial carbon blacks include, carbon blacks sold under the Regal®, Sterling® and Vulcan® trademarks available from Cabot Corporation (such as Regal® 330, Regal® 300, Regal® 90, Regal® 85, Regal® 80, Sterling® SO, Sterling® SO-1, Sterling® V, Sterling® VH, Sterling® NS-1, Vulcan® 10H, Vulcan® 9, Vulcan® 7H, Vulcan® 6, Vulcan® 6LM, Vulcan® 3, Vulcan® M, Vulcan® 3H, Vulcan® P, Vulcan® K, Vulcan® J and Vulcan® XC72). Carbon blacks available from other suppliers can be used. The starting carbon product can be a dual-phase particle, comprising a carbon phase and a second phase, e.g., a metal oxide or carbide.

The filler, such as the carbon black, can have a low PAH amount. The carbon black can be formed so that the carbon black has a low PAH amount or commercially-available carbon black can be properly treated to remove PAHs so as to form carbon blacks having a low PAH amount. The carbon black of the present invention can have a low PAH amount with any standard ASTM carbon black specifications, for instance with respect to iodine absorption, DBPA, crushed DBPA, CTAB, nitrogen surface area, STSA, and/or tinting strength, and the like. The carbon black can be an ASTM specification carbon black, such as a N110, N121, N220, N231, N234, N299, N326, N330, N339, N347, N351, N358, N375, N539, N550, N650, N660, N683, N762, N765, N774, N787, and/or N990 carbon black, which has the ASTM specification properties for the particular N-series carbon black. The carbon black can have a STSA ranging from 20 $m^2/g$ to 150 $m^2/g$ or higher. The carbon black can be any ASTM grade carbon black having the low PAH amount, such as from a N110 ASTM carbon black to a N990 ASTM carbon black and more preferably a N110 to N500 ASTM carbon black. Any commercial grade of carbon black can be formed to have a low PAH amount and/or can be subsequently treated to have a low PAH amount based on the present invention.

For purposes of the present invention, a low PAH amount includes or is defined by a low PAH 22. As indicated above, a PAH 22 is a measurement of PAHs as set forth in FIG. 1 of U.S. Patent Application Publication No. 2008/159947. For purposes of the present invention, a low PAH amount can be defined by a low PAH 22. Examples of suitable amounts include 500 ppm or less, 400 ppm or less, 300 ppm or less, 200 ppm or less, 150 ppm or less, 125 ppm or less, 100 ppm or less, 75 ppm or less, 50 ppm or less, 25 ppm or less, with respect to the amount of PAH 22 present in the carbon black. Suitable ranges include from about 1 ppm to about 500 ppm, 5 ppm to 500 ppm, 15 ppm to 500 ppm, 5 ppm to 50 ppm, 5 ppm to 100 ppm, 1 ppm to 100 ppm, or 1 ppm to 30 ppm, with respect to the total amount of PAH 22 present in the carbon black. For any of the ranges or amounts provided above, the lower limit can be 0.1 ppm, 1 ppm, 2 ppm, 5 ppm, 10 ppm, or 15 ppm. The ranges can be exact or approximate (e.g., "about 1 ppm" and the like). The ppm ranges can apply to all or any number of PAHs (e.g., all PAHs or one or more of the PAHs). For purposes of the present invention, the PAH22 is a measurement of the PAHs identified in FIG. 1 of U.S. Patent Application Publication No. 2008/159947 except for Benzo(j)fluoranthrene. Also, the PAH8 for purposes of the present invention is a measurement of Benzo(a)anthracene, Benzo(a)pyrene, Benzo(e)pyrene, Benzo(b)fluoranthrene, Benzo(j)fluoranthrene, Benzo(k)fluoranthrene, Chrysene, and Dibenzo(a,h)anthracene. BaP is a reference to Benzo(a)pyrene.

The carbon black of the present invention can have a PAH content of from about 0.15 to about 2 micrograms/$m^2$, such as from 0.2 to 1.5 micrograms/$m^2$, or from 0.3 to 1.25 micrograms/$m^2$, or from 0.4 to 1.0 micrograms/$m^2$, and the like.

In general, the carbon black can be a furnace black, channel black, lamp black, thermal black, acetylene black, plasma black, a carbon product containing silicon-containing species and/or metal containing species, and the like. The carbon black can be a short quench or long quench black.

For purposes of the present invention, a short quench carbon black can be used and can be considered a carbon black formed by a process wherein the carbon black, after formation from pyrolysis, is subjected a short quench to stop the carbon black forming reactions. The short quench is a parameter of the furnace carbon black manufacturing process that assures the value of the CB Toluene Discoloration (tested per ASTM D1618) of 95%, or lower. Examples of short quench carbon blacks include, but are not limited to, Vulcan® 7H carbon black, Vulcan® J carbon black, Vulcan® 10H carbon black, Vulcan® 10 carbon black, Vulcan® K carbon black, Vulcan® M carbon black, and N-121 carbon black. The short quench carbon black can be a furnace carbon black. The short quench carbon black can be a N110 to N787 ASTM carbon black. The short quench carbon black can have any of the parameters described above with respect to PAH content, STSA, $I_2$No (mg/g)/STSA ($m^2/g$) ratio, DBP, and the like.

The carbon black can be an oxidized carbon black, such as pre-oxidized using an oxidizing agent. Oxidizing agents include, but are not limited to, air, oxygen gas, ozone, $NO_2$ (including mixtures of $NO_2$ and air), peroxides such as hydrogen peroxide, persulfates, including sodium, potassium, or ammonium persulfate, hypohalites such a sodium hypochlorite, halites, halates, or perhalates (such as sodium chlorite, sodium chlorate, or sodium perchlorate), oxidizing acids such a nitric acid, and transition metal containing oxidants, such as permanganate salts, osmium tetroxide, chromium oxides, or ceric ammonium nitrate. Mixtures of oxidants may be used, particularly mixtures of gaseous oxidants such as oxygen and ozone. In addition, carbon blacks prepared using other surface modification methods to introduce ionic or ionizable groups onto a pigment surface, such as chlorination and sulfonation, may also be used. Processes that can be employed to generate pre-oxidized carbon blacks are known in the art and several types of oxidized carbon black are commercially available.

Details regarding silicon-treated carbon blacks and methods for manufacturing them are provided, for example, in U.S. Pat. Nos. 5,830,930; 5,877,238; 6,028,137; and 6,323,273 B1, all incorporated herein by reference in their entirety.

Also suitable as starting materials are silica-coated carbon blacks. Such carbon blacks are described, for example, in U.S. Pat. No. 6,197,274 B1, which is incorporated herein by reference in its entirety.

Silicon-treated carbon black may be oxidized with oxidizing agents such as, for instance, nitric acid and ozone and/or can be combined with a coupling agent, as described, e.g., in U.S. Pat. No. 6,323,273 B1.

With respect to the metal oxide, the metal oxide can be alumina, aluminum-containing filler, zinc oxide, zinc-containing filler, a silica or silica-containing filler, such as a fumed silica or precipitated silica. The silica can be dispersible silica as that term is used in elastomers. More specific examples include Z1165 silica, Rhodia (Rhone-Poulenc)'s Zeosil® HDS, Evonik Industries (Degussa)'s Ultrasil® 5000 GR and 7000 GR, and PPG's Hi-Sil 223, Agilon 400 and Ciptane™ silicas. The metal oxide, such as silica, can have a CTAB of 100 $m^2/g$ to 240 $m^2/g$, and/or a BET of 100 to 240 $m^2/g$; and/or a total pore volume of at least 2.5 $cm^3/g$ and/or a DOP oil adsorption of 150 ml/100 g to 400 ml/100 g.

For purposes of the present invention, the silica-containing filler includes any filler which contains a silica content of at least 0.1% by weight, based on the weight percent of the filler. The silica-containing filler can contain a silica weight percent of at least 0.3 wt %, at least 0.5 wt %, at least 1 wt %, at least 5 wt %, at least 7.5 wt %, at least 10 wt %, at least 15 wt %, at least 17.5 wt %, at least 20 wt %, at least 25 wt %, at least 30 wt %, at least 35 wt %, at least 40 wt %, at least 50 wt %, at least 60 wt %, at least 70 wt %, at least 80 wt %, at least 90 wt %, or from 0.1 wt % to 100 wt %, from 2 wt % to 100 wt %, from 5 wt % to 99 wt %, from 10 wt % to 90 wt %, from 15 wt % to 90 wt %, from 15 wt % to 50 wt %, from 15 wt % to 35 wt %, or less than or equal to 50 wt % and any other weight percents, all weight percents based on the total weight of the silica-containing filler. The silica-containing filler can be or include precipitated silica, fumed silica, silica-coated carbon black, and/or silicon-treated carbon black. Any of the silica-containing fillers can be chemically functionalized, such as to have attached chemical groups, such as attached organic groups. Any combination of silica-containing fillers can be used. Further, the silica-containing filler(s) can be used in combination with, as an option, any non-silica-containing filler, such as carbon black(s).

In silicon-treated carbon black, a silicon containing species, such as an oxide or carbide of silicon, is distributed through at least a portion of the carbon black aggregate as an intrinsic part of the carbon black. Conventional carbon blacks exist in the form of aggregates, with each aggregate consisting of a single phase, which is carbon. This phase may exist in the form of a graphitic crystallite and/or amorphous carbon, and is usually a mixture of the two forms. Carbon black aggregates may be modified by depositing silicon-containing species, such as silica, on at least a portion of the surface of the carbon black aggregates. The result may be described as silicon-coated carbon blacks.

The materials described herein as silicon-treated carbon blacks are not carbon black aggregates which have been coated or otherwise modified, but actually represent a different kind of aggregate having two phases. One phase is carbon, which will still be present as graphitic crystallite and/or amorphous carbon, while the second phase is silica (and possibly other silicon-containing species). Thus, the silicon-containing species phase of the silicon-treated carbon black is an intrinsic part of the aggregate; it is distributed throughout at least a portion of the aggregate. A variety of silicon-treated blacks are available from Cabot Corporation under the name Ecoblack™ CRX2125 and CRX4210. It will be appreciated that the multiphase aggregates are quite different from the silica-coated carbon blacks mentioned above, which consist of pre-formed, single phase carbon black aggregates having silicon-containing species deposited on their surface. Such carbon blacks may be surface-treated in order to place a silica functionality on the surface of the carbon black aggregate as described in, e.g., U.S. Pat. No. 6,929,783.

The silicon-treated carbon black can include silicon-containing regions primarily at the aggregate surface of the carbon black, but still be part of the carbon black and/or the silicon-treated carbon black can include silicon-containing regions distributed throughout the carbon black aggregate. The silicon-treated carbon black can be oxidized. The silicon-treated carbon black can contain from about 0.1% to about 50% silicon by weight, based on the weight of the silicon-treated carbon black. These amounts can be from about 0.5 wt % to about 25 wt % or from about 2 wt % to about 15 wt % silicon, all based on the weight of the silicon-treated carbon black.

With regard to the process to form the modified filler having an adsorbed chemical group(s), any conventional adsorption technique can be used. For instance, the chemical group that is desired to be on the filler or on the surface of the filler to form this version of the modified filler can be dissolved in a suitable solvent and applied to the surface of the filler, wherein the solvent can then be removed, such as by evaporation techniques. As an alternative, the chemical to be adsorbed onto the surface of the filler to form the modified filler can be melted. Any manner to contact the filler with the chemical to be adsorbed onto the surface of the filler can be used, such as spray coating techniques, and the like. The chemical solution to be adsorbed on the filler can be mixed together in a pin pelletizer and the solvent can then be evaporated.

As an option, the modified filler having the adsorbed chemical group, as mentioned herein, can optionally also include the attachment of one or more chemical groups.

For purposes of the present invention, the attachment of one or more chemical groups means that the chemical group is not adsorbed onto the surface of the filler and cannot be removed or substantially removed by the extraction process described earlier for purposes of removing an adsorbed chemical. The attachment of at least one chemical group generally is by a chemical attachment, such as by a covalent bond.

The chemical group can be at least one organic group. The organic group can include or be an alkyl group and/or an aromatic group. More specific examples include a $C_{1-20}$ alkyl group or a $C_{6-18}$ aromatic group, such as a $C_1$-$C_{12}$ alkyl group or $C_6$-$C_{12}$ aromatic group(s). Examples of attached groups can include an alkyl or aromatic group that has one or more functional groups that can be the same as substituent A described herein. The alkyl group and/or aromatic group can be directly attached to the filler.

A method to attach one or more chemical groups onto the filler to form this type of modified filler can include any known attachment mechanism for attaching chemical groups to filler particles, including diazonium reactions.

The modified filler having attached chemical groups can be prepared using and adapting the methods described in U.S. Pat. Nos. 5,554,739; 5,707,432; 5,837,045; 5,851,280; 5,885,335; 5,895,522; 5,900,029; 5,922,118; 6,042,643; 6,398,858; 7,175,946; 6,471,763; 6,780,389; 7,217,405; 5,859,120; and 6,290,767; U.S. Patent Application Publication Nos. 2003-0129529 A1; 2002-0020318; 2002-0011185 A1; and 2006-0084751 A1, and PCT Publication No. WO 99/23174, which are incorporated in their entireties herein by reference. These references describe, in part, the use of diazonium chemistry to attach functional groups to pigments. As just an example, these processes have been adapted and used to form the modified fillers of the present invention (having attached chemical groups).

An amino version of a triazole, pyrazole, and/or imidazole can be used (examples provided in the Example section of this application), and then using the diazonium reaction, for instance, described in the above patents, can be attached onto the filler to form this version of the modified filler having an attached chemical group, such as an organic group, and such as an attached at least one triazole group, pyrazole group, and/or imidazole group. The attached triazole, pyrazole, and/or imidazole group are further exemplified below for another version of a modified filler, and would be applicable here as well.

The modified filler (with attached chemical groups) may be prepared using any method known to those skilled in the art for attaching chemical groups. For example, the modified fillers can be prepared using the methods described in the above cited patents/publications. Other methods for preparing the modified fillers include reacting a filler having available functional groups with a reagent comprising the organic group, such as is described in, for example, U.S. Pat. No. 6,723,783, which is incorporated in its entirety by reference herein. Such functional fillers may be prepared using the methods described in the references incorporated above. In addition modified fillers containing attached functional groups may also be prepared by the methods described in U.S. Pat. Nos. 6,831,194 and 6,660,075, U.S. Patent Publication Nos. 2003-0101901 and 2001-0036994, Canadian Patent No. 2,351,162, European Patent No. 1 394 221, and PCT Publication No. WO 04/63289, as well as in N. Tsubokawa, Polym. Sci., 17, 417, 1992, each of which is also incorporated in their entirety by reference herein.

The amount of attached groups can be varied, depending on the desired use of the modified filler and the type of attached group. For example, the total amount of organic group attached may be from about 0.01 to about 6.0 micromoles of groups/m$^2$ surface area of filler, as measured by nitrogen adsorption (BET method), including from about 0.1 to about 5.0 micromoles/m$^2$, from about 0.2 to about 3.0 micromoles/m$^2$, or from about 0.3 to about 2.0 micromoles/m$^2$.

Examples of the triazole, pyrazole, and/or imidazole groups are the same as for the adsorbed chemical groups described above, except these groups are attached, for instance, by way of a chemical bond to the filler. Examples of the attached chemical groups are set forth below.

For purposes of the present invention, the triazole includes a chemical group that has a triazole-containing group. The triazole can be a 1,2,4 triazole or a 1,2,3 triazole. The triazole can be a thiol or polysulfide-containing polytriazole. 1,2,4 triazole or 1,2,4 triazole-containing groups are preferred as adsorbed and/or attached triazole chemical groups in view of achieved properties, especially in elastomeric composites. With regard to the attached triazole, examples include, but are not limited to, the following:

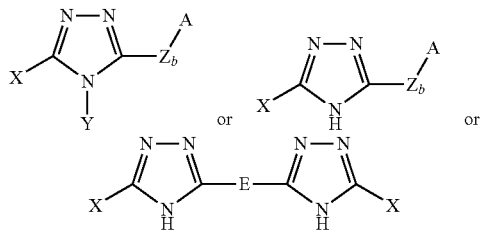

or tautomers thereof,
wherein the substituents are the same as stated earlier, except X (or one of the X's) is or includes a bond to the filler to become attached.

In the triazole formulas,
$Z_b$ is an alkylene group (e.g., a $C_1$-$C_4$ alkylene), where b is 0 or 1;
at least one X comprises a bond to the filler, and any remaining X comprises a bond to the filler or a functional group, such as the various substituents A and/or R described herein;
A is a functional group that is $S_k R$, $SSO_3H$, $SO_2NRR'$, $SO_2SR$, $SNRR'$, $SNQ$, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of the functional group(s);

where R and R', which are the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8 when R is H and otherwise k is 2 to 8;

Q is $(CH_2)_w$, $(CH2)_xO(CH_2)_z$, $(CH_2)_xNR(CH_2)_z$, or $(CH_2)_x S(CH_2)_z$, where x is 1 to 6, z is 1 to 6, and w is 2 to 6;

E is a polysulfur-containing radical; and the triazole can be optionally N– substituted with an NDD' substituent, where D and D', which are the same or different, are H or $C_1$-$C_4$ alkyl; and Y is H, alkyl, aryl, or $NH_2$.

In specific examples, the group attached to the filler can be or include a mercapto-triazolyl group, e.g. a 5-mercapto-1,2,4-triazole-3-yl group, and/or a triazole disulfide group, and/or a 1,2,4-triazol-3-yl group. The group attached to the filler can be or include a 2-mercapto-1,3,4-thiadiazol-5-yl group and/or a thiadiazole disulfide group. Substituted or unsubstituted oxadiazole groups as well as other substituted or unsubstituted azole, e.g., diazole, groups, can be attached, e.g., directly, to the filler.

For purposes of the present invention, the attached pyrazole is or includes a chemical that has a pyrazole-containing group. The pyrazole can be a thiol or polysulfide-containing polypyrazole. With regard to the pyrazole, examples include, but are not limited to, the following:

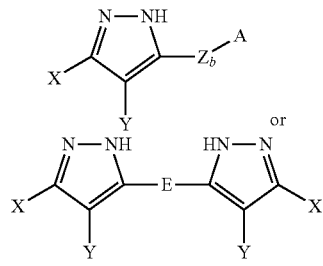

or tautomers thereof,
wherein the substituents are the same as stated earlier, except X (or one of the X's) is or includes a bond to the filler to become attached.

In the pyrazole formulas,
$Z_b$ is an alkylene group (e.g., a $C_1$-$C_4$ alkylene), where b is 0 or 1;
at least one X or Y comprises a bond to the filler and any other X or Y, which is the same or different, comprises a bond or a functional group, such as the various substituents A and/or R described herein;
A is a functional group that is $S_k R$, $SSO_3H$, $SO_2NRR'$, $SO_2SR$, $SNRR'$, $SNQ$, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of the functional group(s);

where R and R', which are the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8 when R is H and otherwise k is 2 to 8;

Q is $(CH_2)_w$, $(CH2)_xO(CH_2)_z$, $(CH_2)_xNR(CH_2)_z$, or $(CH_2)_x S(CH_2)_z$, where x is 1 to 6, z is 1 to 6, and w is 2 to 6; and E is a polysulfur-containing group.

For purposes of the present invention, the attached imidazole is or includes a chemical that has an imidazole-containing group. The imidazole can be a thiol or polysulfide-containing polyimidazole. With regard to the imidazole, examples include, but are not limited to, the following:

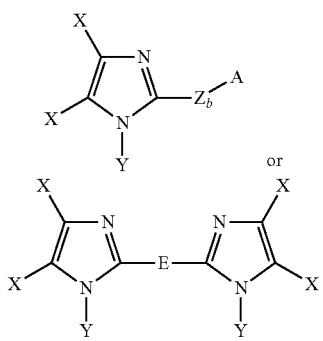

or tautomers thereof, wherein the substituents are the same as stated earlier, except X (or one of the X's) is or includes a bond to the filler to become attached.

In the imidazole formulas, $Z_b$ is an alkylene group (e.g., a $C_1$-$C_4$ alkylene), where b is 0 or 1;

each X comprises a bond to the filler, H, alkyl (examples provided elsewhere apply here), aryl (examples provided elsewhere apply here), or $NH_2$, with the proviso that at least one X comprises a bond;

Y is H or $NH_2$;

A is a functional group that is $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;

where R and R', which can be the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8;

Q is $(CH_2)_w$, $(CH2)_xO(CH_2)_z$, $(CH_2)_xNR(CH_2)_z$, or $(CH_2)_x S(CH_2)_z$, where x is 1 to 6, z is 1 to 6, and w is 2 to 6; and E is a polysulfur-containing group.

The attached organic group can be or comprise an alkyl group or aromatic group having at least functional group that is R, OR, COR, COOR, OCOR, a carboxylate salt, halogen, CN, $NR_2$, $SO_3H$, a sulfonate salt, NR(COR), $CONR_2$, $NO_2$, $PO_3H_2$, a phosphonate salt, a phosphate salt $N=NR$, $NR_3^+X^-$, $PR_3^+X^-$, $S_kR$, $SSO_3H$, a $SSO_3^-$ salt, $SO_2NRR'$, $SO_2SR$, SNRR', SNQ, $SO_2NQ$, $CO_2NQ$, S-(1,4-piperazinediyl)-SR, 2-(1,3-dithianyl) 2-(1,3-dithiolanyl), SOR, or $SO_2R$, wherein R and R', which are the same or different, are independently hydrogen, branched or unbranched $C_1$-$C_{100}$ substituted or unsubstituted, saturated or unsaturated hydrocarbon, and k is an integer that ranges from 1-8, and $X^-$ is a halide or an anion derived from a mineral or organic acid, Q is $(CH_2)_w$, $(CH_2)_xO(CH_2)_z$, $(CH_2)_xNR(CH_2)_z$, or $(CH_2)_x S(CH_2)_z$, where w is an integer from 2 to 6 and x and z are independently integers from 1 to 6.

The attached organic group can be or comprise an aromatic group having a formula AyAr—, wherein Ar is an aromatic radical and A is R, OR, COR, COOR, OCOR, a carboxylate salt, halogen, CN, $NR_2$, $SO_3H$, a sulfonate salt, NR(COR), $CONR_2$, $NO_2$, $PO_3H_2$, a phosphonate salt, a phosphate salt $N=NR$, $NR_3^+X^-$, $PR_3^+X^-$, $S_kR$, $SSO_3H$, a $SSO_3^-$ salt, $SO_2NRR'$, $SO_2SR$, SNRR', SNQ, $SO_2NQ$, $CO_2NQ$, S-(1,4-piperazinediyl)-SR, 2-(1,3-dithianyl) 2-(1,3-dithiolanyl), SOR, or $SO_2R$, wherein R and R', which are the same or different, are independently hydrogen, branched or unbranched $C_1$-$C_{100}$ substituted or unsubstituted, saturated or unsaturated hydrocarbon, and k is an integer that ranges from 1-8, and $X^-$ is a halide or an anion derived from a mineral or organic acid, Q is $(CH_2)_w$, $(CH_2)_xO(CH_2)_z$, $(CH_2)_xNR(CH_2)_z$, or $(CH_2)_xS(CH_2)_z$, where w is an integer from 2 to 6 and x and z are independently integers from 1 to 6, and y is an integer from 1 to the total number of —CH radicals in the aromatic radical.

Ar can be or comprise a triazole group, Ar can be or comprise a pyrazole group, or Ar can be or comprise an imidazole group.

The attached organic group can be or comprise at least one aminomethylphenyl group and/or carboxyphenyl.

The attached organic group can be or comprise X—$C_6H_4$—S—S—$C_6H_4$—X, where at least one X is a bond to the filler and the other X is a bond to the filler or a functional group, such as the substituent A described herein.

The attached organic group can be or comprise at least one aromatic sulfide or polysulfide.

As an option, one or more additional but different chemical groups can be attached onto the filler, such as one or more additional chemical groups that are different from an attached triazole, attached pyrazole, and/or attached imidazole. The attached chemical group can be any of the attached chemical groups described earlier and/or in the above-mentioned patents, such as an attached alkyl group and/or attached aromatic group, for instance, amino methyl phenyl, carboxy phenyl, or phenyl disulfide phenyl ($C_6H_5$—S—S—$C_6H_4$).

For purposes of the present invention, a further version of the modified fillers of the present invention is where the modified filler comprises a filler having attached at least one triazole, such as at least 1,2,4 triazole, such as at least 1,2,4 triazole having a sulfur-containing substituent, for instance, in the presence or absence of any other aromatic group. The modified filler having the attached chemical group, such as the at least one triazole, can improve hysteresis when present in an elastomer composition compared to the same filler that is not modified. Again, the elastomeric formulations set forth in the Examples can be used to confirm this test property. A further modified filler of the present invention is or comprises a filler having attached thereon a triazole comprising:

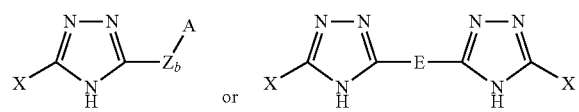

or tautomers thereof, wherein wherein $Z_b$ is an alkylene group (e.g., a $C_1$-$C_4$ alkylene), where b is 0 or 1;

at least one X comprises a bond to the filler and any remaining X comprises a bond to the filler or a functional group, such as the various substituents A or R described herein;

A is a functional group that is $S_kR$, $SSO_3H$, $SO_2NRR'$, $SO_2SR$, $SNRR'$, $SNQ$, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of the functional group(s);

where R and R', which can be the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8;

Q is $(CH_2)_w$, $(CH2)_xO(CH_2)_z$, $(CH_2)_xNR(CH_2)_z$, or $(CH_2)_x S(CH_2)_z$, where x is 1 to 6, z is 1 to 6, and w is 2 to 6;

E is a polysulfur-containing radical; and the triazole can be optionally N– substituted with an NDD' substituent, where D and D', which are the same or different, are H or $C_1$-$C_4$ alkyl.

This version of the modified filler can be with or without any adsorbed chemical groups.

Throughout the present application, with respect to the attached chemical groups onto the filler, the chemical group is attached through at least one bond from the chemical group to the filler. In the present application, the substituent X can represent or comprise a bond. It is to be understood for purposes of the present invention that the substituent X can include a bond, as well as other substituents or elements, for instance, for purposes of achieving the bond to the filler. For example, X can be or consist of a bond. In the alternative, X can comprise a bond. For instance, X can be a bond that includes a linker group. The linker group can be a silane linker group or derived from a silane coupling agent. The linker group can be or include a Si-containing group, a Ti-containing group, a Cr-containing group, and/or Zr-containing group, or other suitable linker groups that promote the attachment of a chemical group onto a filler, such as a metal oxide filler, for instance, silica. Examples of such linkers which can be adopted for purposes of the present invention, include those set forth in U.S. Pat. Nos. 3,947,436; 5,159,009; and 5,116,886, all incorporated in their entirety by reference herein.

In the present invention, for the various versions (adsorbed and/or attached groups) of the modified filler of the present invention, the preparation of the modified filler can occur and should occur prior to the filler being introduced with other ingredients, such as the ingredients to form an elastomeric composition, such as at least one elastomer. Put another way, the chemical group(s) used in the present invention are pre-adsorbed and/or pre-attached to the filler(s) prior to mixing or compounding or otherwise contacting at least one elastomer or at least one polymer and/or other components of a formulation. The present inventors have discovered that various properties achieved by the present application, namely hysteresis and/or abrasion resistance can be diminished or not achieved at all when the modification of the filler is attempted in the presence of other ingredients (e.g., in situ), such as trying to compound with at least one elastomer and/or at least one polymer.

For purposes of the present invention, any combination of modified fillers of the present invention can be used. For instance, as described herein, various versions of the modified filler have been described. For instance, one version of the modified filler of the present invention is a filler having adsorbed groups and, optionally, with attached chemical groups. Another version of the present invention involves a filler having attached chemical groups without any adsorbed groups. Thus, as one option, a formulation, such as an elastomeric formulation, can comprise a combination of various modified fillers of the present invention, for instance, some modified filler having one or more adsorbed chemical groups can be used in combination with one or more other modified fillers having attached chemical groups. Thus, any combination of the modified fillers in formulations, such as elastomeric or polymeric formulations, can be used.

For purposes of the present invention, when the modified filler has an adsorbed chemical group and an attached chemical group, the placement of the adsorbed chemical group onto the filler can occur before, during, and/or after attachment of the chemical group, or in any sequence when more than one adsorbed and/or more than one attached group is present on the filler.

The present invention further relates to elastomeric compositions or elastomeric composites, also considered rubber compositions or composites. The elastomeric composition contains at least one functionalized elastomer and at least one modified filler of the present invention and, optionally, one or more conventional components used in elastomer formulations. More than one type of modified filler can be used.

Exemplary functionalized elastomers include, but are not limited to, functionalized rubbers or polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene and the like. The functionalized elastomer can be, for example, a functionalized diene elastomer. A diene elastomer can be the base elastomer or rubber material, which can be functionalized and used as a functionalized elastomer component in the preparation of elastomeric composites of the present invention. The diene elastomer can be, for example, polyisoprene, polybutadiene, chloroprene, polyisoprene, a copolymer of a diene and a vinyl aromatic compound, a copolymer of a diene and at least one alpha-olefin, a copolymer of butadiene and isoprene, a copolymer of isobutylene and isoprene, a terpolymer of butadiene, a vinyl aromatic compound, and isoprene, or any combination thereof. The base elastomer (i.e., without functionalization) may have a glass transition temperature (Tg), as measured by differential scanning calorimetry (DSC), ranging from about −120° C. to about 0° C. Examples include, but are not limited to, solution SBR (or SSBR), styrene-butadiene rubber (SBR), natural rubber and its derivatives such as chlorinated rubber, polybutadiene, polyisoprene, poly(styrene-co-butadiene) and the oil extended derivatives of any of them. Blends of any of the foregoing may also be used. Particular suitable base synthetic rubbers can include: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinylpyridine, 5-methyl-2-vinylpyridine, 5-ethyl-2-vinylpyridine, 2-methyl-5-vinylpyridine, allyl-substituted acrylates, vinyl ketone, methyl isopropenyl ketone, methyl vinyl either, alphamethylene carboxylic acids and the esters and amides thereof such as acrylic acid and dialkylacrylic acid amide. Also suitable for use herein as base elastomers are copolymers of ethylene and other high alpha olefins such as propylene, 1-butene and 1-pentene.

The functionalized elastomers can be elastomers which have been modified to have one or more functional groups attached to an elastomeric polymer. The attachments, for example, can be chemical attachments to the structure of the elastomer polymer. The functional groups can be attached, for example, at terminal ends and/or pendant to the polymeric backbone or main chain or any side chain thereof, and/or at other locations of the elastomer. The functional groups can be organic groups, organometallic groups, or metallic groups, or any combinations thereof. The functional groups can include, for example, amine groups, silane groups, aminosilane groups, mercaptosilane groups, hydroxyl groups, carboxylic groups, epoxy groups, tin-coupled groups, or the like, or any combination thereof. A diene elastomer which can be functionalized with one or more of these types of groups, can be, for example, a styrene-butadiene rubber, or any other diene elastomer. The functionalized diene elastomer can be amine-functionalized, silane-functionalized, amino silane-functionalized, mercaptosilane-functionalized, hydroxyl-functionalized, carboxylic-functionalized, triazole-functionalized, epoxy-functionalized, tin-coupled, or any combination thereof. An elastomer can be functionalized with a single type of functional group, or can have different types of functional groups to be polyfunctional. The number of the functional groups in the elastomer molecule can be at least one, or at least two, or at least three, or at least four, or more. The content of any of the carboxylic groups, amine groups, silane groups, aminosilane groups, mercapto groups, hydroxyl groups, or epoxy groups, or combined amounts thereof for polyfunctionalized elastomers, bonded to the (co)polymer rubber or elastomer can be, for example, at least about 0.5 milliequivalents/kg (meq/kg), or from about 0.5 to about 200 meq/kg of rubber (co)polymer (e.g., diene elastomer), or from about 1 to about 100 meq/kg of rubber (co)polymer, or from about 2 to about 50 meq/kg of rubber (co)polymer, or other amounts. The content of the functional groups in the elastomer may be determined, for example, by a potentiometric titration method or other known suitable technique for the functional group.

Amine-functionalized elastomers are commercially available and known in the art, which can be used a functionalized elastomeric component of elastomeric compositions of the present invention. Amine-functionalized elastomers are available, for example, as BR1256H butadiene rubber from Zeon Chemical (Louisville, Ky.) and SLR4601 solution styrene-butadiene rubber (SSBR) from Styron LLC (Berwyn, Pa.). Amine-functionalized elastomers which can be used include those shown, for example, in U.S. Patent Application Publication No. 2011/0048605 A1, which is incorporated herein by reference in its entirety. The amine groups can be, for example, a primary amine group, a secondary amine group, or form part of a monomer or a larger organofunctional group reacted with or attached to the rubber (co)polymer. Silane-functionalized elastomers are commercially available and known in the art, which can be used in the present invention. Silane-functionalized elastomers which can be used include those shown, for example, in U.S. Pat. No. 6,013,718, which is incorporated herein by reference in its entirety. These silane-functionalized rubber compositions, for example, can be based on organosilane. As examples of organosilane functionalizing agents capable of reacting with the diene polymer can be, for example, linear dihalosilanes which correspond to the formula $R_1R_2SiX_2$ wherein $R_1$ and $R_2$, which are identical or different, denote an alkyl, cycloalkyl, aryl, alkaryl, aralkyl or vinyl group containing from 1 to 10 carbon atoms, X denotes a halogen atom, preferably chlorine or bromine. Dichlorodimethylsilane, dichlorodiethylsilane, dichlorodiphenylsilane, dichlorophenylmethylsilane and dichlorovinylmethylsilane may be included as dihalosilane compounds. Aminosilane-functionalized elastomers are commercially available and known in the art, which can be used in the present invention. Aminosilane-functionalized elastomers are available, for example, as HPR355 solution styrene-butadiene rubber (SSBR) from Japan Synthetic Rubber (JSR) Corporation (Nagoya, Japan). Aminosilane-functionalized elastomers which can be used include those shown, for example, in U.S. Pat. No. 7,342,070 B2, which is incorporated herein by reference in its entirety. These aminosilane-functionalized rubber compositions can be conjugated diolefin copolymer rubbers. Mercaptosilane-functionalized elastomers are known in the art, which can be used in the present invention. Mercaptosilane-functionalized elastomers which can be used include those shown, for example, in U.S. Patent Application Publication Nos. 2011/0082253 A1 and 2010/0186868 A1, which are incorporated herein by reference in their entireties. Hydroxyl-functionalized elastomers are commercially available and known in the art, which can be used in the present invention. Hydroxyl-functionalized elastomers are available, for example, as NS612 and NS616 solution styrene-butadiene rubbers (SSBRs) from Zeon Chemical. Carboxylic-functionalized elastomers are commercially available and known in the art, which can be used in the present invention. A carboxylic or carboxyl group can refer to group which includes at least one —COOH structure. Carboxylic-functionalized elastomers are available, for example, as VP PBR 4003 solution styrene-butadiene rubber (SSBR) from Lanxess (Orange, Tex.). Carboxylic-functionalized elastomers which can be used include those shown, for example, in U.S. Pat. No. 7,396,870 B2, which is incorporated herein by reference in its entirety. Epoxy-functionalized elastomers are commercially available and known in the art, which can be used in the present invention. An epoxy or epoxide group can refer to group which includes at least one oxirane or ethoxyline group. Epoxidized natural rubber can be used, for example, which has a degree of epoxidation of from about 5 mole % to about 60 mole %, or from about 20 to about 55 mole %, or other values. Epoxy-functionalized elastomers are commercially available, for example, as ENR25 rubber (25 mole % epoxidized natural rubber), such as Ekoprena 25 ENR from Mardec Berhad. Epoxy-functionalized elastomers which can be used include those shown, for example, in U.S. Pat. No. 6,969,739 B2, which is incorporated herein by reference in its entirety. An elastomer can be functionalized with a metal coupling agent, such as a tin-coupling agent. Elastomers functionalized with tin coupling agents are available, for example, as Duradene™ 739 polymer from Firestone Polymers (Akron Ohio), and NS-116R from Zeon Chemical. Methods for making the functionalized elastomers, such as functionalized diene elastomers, are known, and can include methods such as shown in the above-mentioned incorporated patent documents. Other examples of functionalized elastomers that can be used include those set forth in U.S. Pat. Nos. 7,836,928 and 7,754,819, both incorporated in their entirety by reference herein. Also, the functionalized elastomer can be a homopolymer, copolymer, or terpolymer.

The functionalized diene elastomers according to the present invention, which can have functions along and/or at the ends of the chain, may be used on their own in a composition, or may be used in a blend with any other elastomers, such as those conventionally used in tires, such as natural rubber or a blend based on natural rubber and a synthetic elastomer, or alternatively may be used with another diene elastomer which may possibly be partially or entirely functionalized with different functions along the chain. The addition amounts of modified filler shown herein for elastomeric compositions can be applied to compositions which use functionalized elastomer. As noted further below, the functionalized rubber compositions can contain, in addition to the functionalized elastomer and filler and coupling agent, various processing aids, oil extenders, antidegradents, and/or other additives.

As an option, a continuously-fed latex and a filler, such as a carbon black slurry, can be introduced and agitated in a coagulation tank. This is also known as a "wet mix" technique. The latex and filler slurry can be mixed and coagulated in the coagulation tank into small beads, referred to as "wet crumb." The various processes and techniques described in U.S. Pat. Nos. 4,029,633; 3,048,559; 6,048,923; 6,929,783; 6,908,961; 4,271,213; 5,753,742; and 6,521,691 can be used for this combination of filler with elastomer and coagulation of the latex. Each of these patents are incorporated in their entirety by reference herein. This type of elastomeric formulation can be used with the modified fillers of the present invention using the various techniques, formulations, and other parameters described in these patents and processes, except that the modified fillers of the present invention are used.

Exemplary natural rubber latices include, but are not limited to, field latex, latex concentrate (produced, for example, by evaporation, centrifugation or creaming), skim latex (e.g., the supernatant remaining after production of latex concentrate by centrifugation) and blends of any two or more of these in any proportion. The latex should be appropriate for the wet masterbatch process selected and the intended purpose or application of the final rubber product. The latex is provided typically in an aqueous carrier liquid. Selection of a suitable latex or blend of latices will be well within the ability of those skilled in the art given the benefit of the present disclosure and the knowledge of selection criteria generally well recognized in the industry.

Elastomer composites can be prepared with a filler loading of at least about 40 phr, at least about 50 phr, at least about 55 phr, at least about 60 phr, at least about 65 phr, or at least about 70 phr of carbon black, for example, from about 40 to about 70 phr, from about 50 to about 75 phr, from about 55 to about 80 phr, from 60 to about 85 phr, from 65 to about 90 phr, from 70 to about 90 phr, from 40 to about 60 phr, between 50 and about 65 phr, from 55 to about 80 phr, from about 60 to about 90 phr, from about 65 to about 80 phr, or from about 70 to about 80 phr.

One or more coupling agents can be used in the present invention. The coupling agent can be or include one or more silane coupling agents, one or more zirconate coupling agents, one or more titanate coupling agents, one or more nitro coupling agents, or any combination thereof. The coupling agent can be or include bis(3-triethoxysilylpropyl) tetrasulfane (e.g., Si 69 from Evonik Industries, Struktol SCA98 from Struktol Company), bis(3-triethoxysilylpropyl) disulfane (e.g., Si 75 and Si 266 from Evonik Industries, Struktol SCA985 from Struktol Company), 3-thiocyanato-propyl-triethoxy silane (e.g., Si 264 from Evonik Industries), gamma-mercaptopropyl-trimethoxy silane (e.g., VP Si 163 from Evonik Industries, Struktol SCA989 from Struktol Company), gamma-mercaptopropyl-triethoxy silane (e.g., VP Si 263 from Evonik Industries), zirconium dineoalkanolatodi(3-mercapto) propionato-O,N,N'-bis(2-methyl-2-nitropropyl)-1,6-diaminohexane, NXT silane coupling agent (a thiocarboxylate functional silane: 3-Octanoylthio-1-propyltriethoxysilane) from Momentive Performance Materials, Wilton, Conn., and/or coupling agents that are chemically similar or that have the one or more of the same chemical groups. Additional specific examples of coupling agents, by commercial names, include, but are not limited to, VP Si 363 from Evonik Industries. The coupling agent can be present in any amount in the elastomer composite. For instance, the coupling agent can be present in the elastomer composite in an amount of at least 0.2 parts per hundred parts of filler, such as silica (by mass), from about 0.2 to 60 parts per hundred of filler, such as silica, from about 1 to 30 parts per hundred of filler, such as silica, from about 2 to 15 parts per hundred of filler, such as silica, or from about 5 to 10 parts per hundred of filler, such as silica.

One or more antioxidants can be used in any of the processes of the present invention. The antioxidant (an example of a degradation inhibitor) can be an amine type antioxidant, phenol type antioxidant, imidazole type antioxidant, metal salt of carbamate, para-phenylene diamine(s) and/or dihydrotrimethylquinoline(s), polymerized quinine antioxidant, and/or wax and/or other antioxidants used in elastomer formulations. Specific examples include, but are not limited to, N-(1,3-dimethylbutyl)-N'-phenyl-p-phenylenediamine (6-PPD, e.g., ANTIGENE 6C, available from Sumitomo Chemical Co., Ltd. and NOCLAC 6C, available from Ouchi Shinko Chemical Industrial Co., Ltd.), "Ozonon" 6C from Seiko Chemical Co., Ltd., polymerized 1,2-dihydro-2,2,4-trimethyl quinoline, Agerite Resin D, available from R. T. Vanderbilt, butylhydroxytoluene (BHT), and butylhydroxyanisole (BHA), and the like. Other representative antioxidants may be, for example, diphenyl-p-phenylenediamine and others such as, for example, those disclosed in The Vanderbilt Rubber Handbook (1978), pages 344-346, which is incorporated in its entirety by reference herein. An antioxidant and an antiozonate are collectively degradation inhibitors. These degradation inhibitors illustratively include a chemical functionality, such as an amine, a phenol, an imidazole, a wax, a metal salt of an imidazole, and combinations thereof. Specific degradation inhibitors operative herein illustratively include N-isopropyl-N'-phenyl-p-phenylenediamine, N-(1-methylheptyl)-N'-phenyl-p-phenylenediamine, 6-ethoxy-2,2,4-trimethyl-1,2-dihydroquinoline, N,N'-diphenyl-p-phenylenediamine, octylated diphenylamine, 4,4'-bis(a,a'-dimethylbenzyl)diphenylamine, 4,4'-dicumyl-diphenylamine, 2,5-di-tert-butyl-hydroquinone, 2,2'-methylene-bis(4-methyl-6-tert-butylphenol), 2,2'-methylenebis(4-methyl-6-methylcyclohexlphenol), 4,4'-thio-bis(3-methyl-6-tert-butylphenol), 4,4'-butylidenebis(3-methyl-6-tert-butylphenol), tris(nonylated phenyl) phosphite, tris-(2,4-di-t-butylphenyl)phosphite, 2-mercaptobenzimidazole, and zinc 2-mercaptobenzimidazole. An example includes at least one amine and one imidazole. Optionally, a polymerized quinoline can be used. The relative amounts of antioxidants can include 0.5 to 3 parts amine, 0.5 to 2.5 parts imidazole, and 0.5 to 1.5 parts of optional polymerized quinoline. The degradation inhibiting amine can be 4,4'-bis(alpha-dimethylbenzyl)diphenylamine, the imidazole can be zinc 2-mercaptotoluimidazole and the polymerized quinoline can be polymerized 1,2-dihydro-2,2, 4-trimethylquinoline. In general, the degradation inhibitors (e.g., the antioxidant(s)) are typically present from 0.1 to 20 parts by weight per 100 parts by weight of polymer or rubber system (phr). Typical amounts of antioxidants may comprise, for example, from about 1 to about 5 phr.

The rubber composition can be for tire or tire parts and can utilize a hydrophilic filler. The hydrophilic filler can have an organic group attached to the filler and the organic group is or includes a substituted or unsubstituted azole group. The group can be a triazole, e.g., a mercapto-triazole and/or a triazole disulfide. The group can be a thiadiazole, e.g., a thiol-substituted thiadiazole.

The modified filler can be combined with conventional tire compound ingredients and additives, such as rubbers, processing aids, accelerators, cross-linking and curing materials, antioxidants, antiozonants, fillers, resins, etc. to make tire compounds. Processing aids include, but are not limited to, plasticizers, tackifiers, extenders, chemical conditioners, homogenizing agents, and peptizers such as mercaptans, synthetic oil, petroleum and vegetable oils, resins, rosins, and the like. Accelerators include amines, guanidines, thioureas, thiurams, sulfenamides, thiocarbamates, xanthates, benzothiazoles and the like. Cross-linking and curing agents include peroxides, sulfur, sulfur donors, accelerators, zinc oxide, and fatty acids. Fillers include clay, bentonite, titanium dioxide, talc, calcium sulfate, silica, silicates and mixtures thereof.

Any conventional mixing procedure can be used to combine the modified filler of the present invention with other components of an elastomer composite. Typical procedures used for rubber compounding are described in Maurice Morton, RUBBER TECHNOLOGY 3$^{rd}$ Edition, Van Norstrand Reinhold Company, New York 1987, and 2$^{nd}$ Edition, Van Nordstrand Reinhold Company, New York 1973. The mixture of components including modified carbon black product of the present invention and an elastomer is preferably thermomechanically mixed together at a temperature between 120° C. and 180° C.

For example, elastomeric composites of the present invention can be obtained by suitable techniques that employ, for instance, mixing in a single step or in multiple steps in an internal mixer, such as a Banbury, Intermesh mixers, extruder, on a mill or by utilizing other suitable equipment, to produce a homogenized blend. Specific implementations use techniques such as those described in U.S. Pat. No. 5,559,169, published Sep. 24, 1996 which is incorporated herein by reference in its entirety.

Curing can be conducted by techniques known in the art. For example, the modified fillers of the present invention can be used in rubber compositions which are sulfur-cured, peroxide-cured and so forth.

The modified filler(s) of the present invention can improve one or more elastomeric properties, such as hysteresis and/or abrasion resistance. Improvement in hysteresis can be measured by measuring the tan/delta properties.

The abrasion index is the ratio of the abrasion rate of an internal control composition divided by the abrasion rate of a rubber composition prepared with a modified filler of the present invention. For simplicity, relative abrasion index values are used in the examples below. The relative abrasion index is defined as the ratio of abrasion index of rubber compositions with the modified filler of the present invention divided by the abrasion index of rubber compositions with untreated filler. In examples where the modified fillers of the present invention are used in combination with other treatments, relative abrasion index is defined as the ratio of abrasion index of rubber compositions with modified filler of the present invention used in combination with a second treatment divided by the abrasion index of rubber compositions with filler treated with the same second treatment. It is generally desirable in the production of tire treads to utilize fillers which produce tire treads with satisfactory abrasion resistance and and/or reduced rolling resistance. Typically, the tread wear properties of a tire are related to this abrasion resistance. The greater the abrasion resistance, the greater the number of miles the tire will last without wearing out. Abrasion data on rubber compositions can be determined using an abrader based on a Lambourn type machine (see, for instance, U.S. Pat. No. 4,995,197). Abrasion rates (cubic centimeter/centimeter travel) typically are measured at 14% or 21% slip, the slip being based on the relative velocity between the sample wheel and grindstone.

It has also been discovered that the modified filler of the present invention can improve hysteresis, for instance, shown by a lower relative maximum tan δ (delta) values in comparison to untreated filler. Lower relative maximum tan δ (delta) values are desirable as they reflect reduced rolling resistance and reduced heat build up in the tread portion of a tire. Reduced rolling resistance improves fuel economy of the car and is a desirable attribute of an elastomer composite for use in the tread portion of a tire.

Tan δ was measured with a Rheometrics Dynamic Spectrometer Model ARES-2K at a constant frequency of 10 Hz, a constant temperature, and in shear mode of strain. Strain sweeps were run from 0.1% to 60% double strain amplitude. Measurements were taken at ten points per decade and the maximum measured tan δ was reported. Relative maximum tan δ value is defined as the ratio of measured maximum tan δ for rubber compositions with modified filler of the present invention divided by the maximum tan δ of rubber compositions with untreated filler. In examples where the modified fillers of the present invention are used in combination with other treatments, relative maximum tan δ is defined as the ratio of measured maximum tan δ for rubber compositions with modified filler of the present invention used in combination with a second treatment divided by the measured maximum tan δ for rubber compositions with filler treated with the same second treatment.

In the present invention, a modified filler, which can be a filler having an adsorbed chemical group as described herein, has the ability to improve abrasion resistance in an elastomeric composition and this can be compared to when an elastomer composition contains the same filler, but is unmodified. Put another way, two elastomeric compositions can be formed—one containing the modified filler of the present invention, which is a filler A modified to have an adsorbed chemical group and this can be compared to the same filler A, but not modified with any adsorbed chemical group (e.g., an unmodified filler A). When this comparison is made, the modified filler of the present invention, which is present in the elastomeric composition, can improve abrasion resistance. For instance, the abrasion resistance can be increased by at least 5%, at least 10%, at least 30%, at least 50%, at least 60%, at least 70%, at least 75%, at least 85%, at least 100%, at least 125%, at least 150%, at least 200%, such as from 5% to 200%, compared to the unmodified filler.

In the present invention, a modified filler, which can be a filler having an attached chemical group as described herein, has the ability to improve hysteresis in an elastomeric composition and this can be compared to when an elastomer composition contains the same filler, but is unmodified. Put another way, two elastomeric compositions can be formed—one containing the modified filler of the present invention, which is a filler B modified to have an attached chemical group and this can be compared to the same filler B, but not modified with any attached chemical group (e.g., an unmodified filler B). When this comparison is made, the modified filler of the present invention, which is present in the elastomeric composition, can improve hysteresis. For instance, the hysteresis can be decreased by at least 1%, at least 5%, at least 10%, at least 15%, at least 20%, at least 25%, at least 30%, at least 35%, at least 40%, at least 45%, or at least 50%, such as from 1% to 50%, compared to the unmodified filler.

The benefits mentioned above with regard to abrasion resistance and hysteresis can be achieved at the same time in the present invention or can be individually controlled. More specifically, the hysteresis can be improved (decreased) and abrasion resistance increased by the use of a modified filler that has an adsorbed chemical group as described herein and an attached chemical group as described herein. Examples of the type of improvements achieved with respect to hysteresis and abrasion resistance (namely the percent improvement mentioned earlier) can be achieved in combination, and any combination of the various percents for hysteresis and abrasion resistance mentioned above can be achieved.

The modified fillers of the present invention can be used in the same applications as conventional fillers, such as inks, coatings, toners, plastics, cable, and the like.

The present invention will be further clarified by the following examples, which are intended to be exemplary of the present invention.

EXAMPLES

Example 1—Preparation of a Carbon Black Product

This example illustrates the preparation of a carbon black product of the present invention. A carbon black with an iodine number of 119 and a DBPA of 125 mL/100 g was used. A solution of 2.60 g NaNO2 in 21.7 g of water was added over a period of about five minutes to a stirring mixture of 150 g of the carbon black, 1301 g water, 5.00 g 3-amino-1,2,4-triazole-5-thiol and 5.14 g 70% methanesulfonic acid at 70 C. The mixing was continued for 50 minutes at 70 C. The mixture was cooled to room temperature and adjusted to a pH of 8.1 with NaOH solution. The product was collected by filtration, washed with 2.5 L of water and dried under vacuum at 70 C. The product had 1.53 wt % S. A sample of the carbon black product that had been subjected to Soxhlet extraction with methanol had 0.89 wt % S, compared to 0.65 wt % S for the untreated carbon black. The sample thus had attached and adsorbed triazoles.

Example 2—Preparation of a Carbon Black Product

This example illustrates the preparation of a carbon black product of the present invention. A carbon black with an iodine number of 119 and a DBPA of 125 mL/100 g was used. A solution of 2.61 g NaNO2 in 23.1 g of water was added over a period of ten minutes to a stirring mixture of 150 g of the carbon black, 1301 g water, 4.31 g 3-amino-1,2,4-triazole-5-thiol and 5.14 g 70% methanesulfonic acid at 70 C. The mixing was continued for an hour at 70 C. The mixture was cooled to room temperature and adjusted to a pH of 7.5 with NaOH solution. The product was collected by filtration, washed with 2.5 L of water and dried under vacuum at 70 C. The product had 1.41 wt % S. A sample of the carbon black product that had been subjected to Soxhlet extraction with methanol had 0.89 wt % S, compared to 0.65 wt % S for the untreated carbon black. The sample thus had attached and adsorbed triazoles.

Example 3—Preparation of a Comparative Carbon Black Product

This example illustrates the preparation of a carbon black product modified using diazonium salts of APDS. A batch pelletizer having a mixing chamber with a 8" diameter and 8" length was heated to 60 C and charged with 300 g of a carbon black with an iodine number of 119 and a DBPA of 125 mL/100 g. 4-Aminophenyldisulfide (19.0 g) and 209 g of water were added. After mixing briefly, 29.0 g of 27.9% sulfuric acid was added. After mixing briefly, 52 g of a 20% solution of NaNO2 in water was added in a few portions, with brief intermediate mixing over five minutes. Water (50 g) was added, and mixing was continued for 30 min at 60 C, and the product was removed from the pelletizer, suspended in 4 L water and filtered. The product was washed with ethanol and then resuspended in 4 L of water. The pH was adjusted to 8 with NaOH solution, and the mixture was filtered and washed until the filtrate had a conductivity of 225 µS/cm. The product was dried in air at 70 C. A sample of the carbon black product that had been subjected to Soxhlet extraction with methanol had 1.61 wt % S, compared to 0.60 wt % S for the untreated carbon black.

Example 4—Preparation of a Comparative Carbon Black Product

This example illustrates the preparation of a carbon black product modified using diazonium salts of ATP. A batch pelletizer having a mixing chamber with a 8" diameter and 8" length was heated to 60 C and charged with 300 g of a carbon black with an iodine number of 119 and a DBPA of 125 mL/100 g. 4-Aminothiophenol (9.67 g) and 240 g of water were added. After mixing briefly, 14.5 g of 27.9% sulfuric acid was added. After mixing briefly, 26 g of a 20% solution of NaNO2 in water was added in a few portions, with brief intermediate mixing over five minutes. Water (50 g) was added, and mixing was continued for 30 min at 60 C, and the product was removed from the pelletizer, suspended in 4 L water and filtered. The product was resuspended in 4 L of water. The pH was adjusted to 9 with NaOH solution, and the mixture was filtered and washed until the filtrate had a conductivity of less than 250 µS/cm. The product was dried in air at 70 C. A sample of the carbon black product that had been subjected to Soxhlet extraction with methanol had 1.09 wt % S, compared to 0.60 wt % S for the untreated carbon black.

Example 5—Preparation of a Carbon Black Product

This example illustrates the preparation of a carbon black product of the present invention. A solution of 1.29 g NaNO2 in 11.9 g of water was added over a period of five minutes to a stirring mixture of 150 g of Intermediate Sample X, 1301 g water, 2.17 g 3-amino-1,2,4-triazole-5-thiol and 2.58 g 70% methanesulfonic acid at 70 C. The mixing was continued for 75 minutes at 70 C. The mixture was cooled to room temperature and adjusted to a pH of 7.5 with NaOH solution. The product was collected by filtration, washed with 2.5 L of water and dried under vacuum at 70 C. The product had 1.07 wt % S. A sample of the carbon black product that had been subjected to Soxhlet extraction with methanol had 0.80 wt % S, compared to 0.65 wt % S for the untreated carbon black. The sample thus had attached and adsorbed triazoles.

Example 6—Preparation of a Carbon Black Product

This example illustrates the preparation of a carbon black product of the present invention. A suspension of 1300 g water, 150 g carbon black and 100 g Clorox sodium hypochlorite solution was mixed and heated to 90 C. The carbon black had an iodine number of 119 and a DBPA of 125 mL/100 g. Mixing was continued for 70 minutes, and the suspension was cooled to 70 C. The pH was adjusted to 4.9 with 0.166 g concentrated H2SO4. 3-Amino-1,2,4-triazole-5-thiol (4.32 g) and 5.15 g 70% methanesulfonic acid were added. A solution of 2.60 g NaNO2 in 21.6 g of water was added over a period of ten minutes. The mixing was continued for 65 minutes at 70 C. The mixture was cooled to room temperature and adjusted to a pH of 7.6 with NaOH solution. The product was collected by filtration, washed with 2 L of water and dried under vacuum at 70 C. The product had 1.38 wt % S. A sample of the carbon black product that had been subjected to Soxhlet extraction with methanol had 0.87 wt % S, compared to 0.65 wt % S for the untreated carbon black. The sample thus had attached and adsorbed triazoles.

Example 7—Preparation of a Carbon Black Product

This example illustrates the preparation of a carbon black product of the present invention. A carbon black with an iodine number of 119 and a DBPA of 125 mL/100 g was used. A solution of 1.30 g NaNO2 in 12.0 g of water was added over a period of six minutes to a stirring mixture of 150 g of the carbon black, 1300 g water, 2.16 g 3-amino-1,2,4-triazole-5-thiol and 2.58 g 70% methanesulfonic acid at 70 C. The mixing was continued for an hour at 70 C. Sulfanilic acid (6.49 g) was added, and then a solution of 2.59 g NaNO2 in 22.3 g water was added over five minutes. The mixing was continued for an hour at 70 C. The mixture was cooled to room temperature and adjusted to a pH of 7.5 with an aqueous NaOH solution. The product was collected and washed with methanol using a Millipore pressure filter having a 0.45 micron membrane. The resulting dispersion was dried at 70 C. A sample of the carbon black product that had been subjected to Soxhlet extraction with methanol had 1.37 wt % S and 0.58 wt % N compared to 0.65 wt % S and 0.34 wt % N for the untreated carbon black.

Example 8—Preparation of a Carbon Black Product

This example illustrates the preparation of a carbon black product of the present invention. A carbon black with an iodine number of 119 and a DBPA of 125 mL/100 g was used. A solution of 2.62 g NaNO2 in 21.8 g of water was added over a period of 15 minutes to a stirring mixture of 150 g of the carbon black, 1301 g water, 4.31 g 3-amino-1,2,4-triazole-5-thiol and 5.15 g 70% methanesulfonic acid at 70 C. The mixing was continued for 65 minutes at 70 C. Sulfanilic acid (6.49 g) was added, and then a solution of 2.59 g NaNO2 in 23.1 g water was added over about ten minutes. The mixing was continued for an hour at 70 C. The mixture was cooled to room temperature and adjusted to a pH of 7.5 with an aqueous NaOH solution. The product was collected, washed with 50/50 water/methanol and then washed with methanol using a Millipore pressure filter having a 0.45 micron membrane. The resulting dispersion was dried at 70 C. A sample of the carbon black product that had been subjected to Soxhlet extraction with methanol had 1.31 wt % S and 0.64 wt % N compared to 0.65 wt % S and 0.34 wt % N for the untreated carbon black.

Example 9—Preparation of a Carbon Black Product

This example illustrates the preparation of a carbon black product of the present invention. A carbon black with an iodine number of 119 and a DBPA of 125 mL/100 g was used. A solution of 2.60 g NaNO2 in 22.4 g of water was added over a period of ten minutes to a stirring mixture of 150 g of the carbon black, 1301 g water, 4.31 g 3-amino-1,2,4-triazole-5-thiol and 5.16 g 70% methanesulfonic acid at 70 C. The mixing was continued for an hour at 70 C. Sulfanilic acid (3.24 g) was added, and then a solution of 1.32 g NaNO2 in 11.7 g water was added over four minutes. The mixing was continued for an hour at 70 C. The mixture was cooled to room temperature and neutralized with an aqueous NaOH solution. The product was collected and washed with methanol using a Millipore pressure filter having a 0.45 micron membrane. The resulting dispersion was dried under vacuum at 70 C. A sample of the carbon black product that had been subjected to Soxhlet extraction with methanol had 1.24 wt % S and 0.62 wt % N compared to 0.65 wt % S and 0.34 wt % N for the untreated carbon black.

Example 10—Preparation of a Silicon Treated Carbon Black Product

This example illustrates the preparation of a silicon treated carbon black product of the present invention. A silicon treated carbon black with an iodine number of 113, a STSA of 128 m2/g, a DBPA of 107 mL/100 g, and a silicon content of 2.64 wt % was used. A solution of 2.60 g NaNO2 in 22.4 g of water was added over a period of ten minutes to a stirring mixture of 150 g of the silicon treated carbon black, 1305 g water, 4.32 g 3-amino-1,2,4-triazole-5-thiol, and 5.16 g 70% methanesulfonic acid at 70 C. The mixing was continued for 65 minutes at 70 C. The mixture was cooled to room temperature and adjusted to a pH of 7.5 with NaOH solution. The product was collected by filtration, washed with 2 L of water and dried under vacuum at 70 C. The product had 1.04 wt % S. A sample of the silicon-treated carbon black product that had been subjected to Soxhlet extraction with methanol had 0.54 wt % S, compared to 0.35 wt % S for the untreated carbon black. The sample thus had attached and adsorbed triazoles.

Example 11—Preparation of a Silicon Treated Carbon Black Product

This example illustrates the preparation of a silicon treated carbon black product of the present invention. A suspension of 1300 g water, 150 g silicon treated carbon black and 100 g Clorox sodium hypochlorite solution was mixed and heated to 90 C. A silicon treated carbon black with an iodine number of 113, a STSA of 128 m2/g, a DBPA of 107 mL/100 g, and a silicon content of 2.64 wt % was used. Mixing was continued for 65 minutes, and the suspension was cooled to 70 C. The pH was adjusted to 5.1 with 0.042 g concentrated H2SO4. 3-Amino-1,2,4-triazole-5-thiol (4.32 g), and 5.17 g 70% methanesulfonic acid were added. A solution of 2.62 g NaNO2 in 22.1 g of water was added over a period of ten minutes. The mixing was continued for an hour at 70 C. The mixture was cooled to room temperature and adjusted to a pH of 7.6 with NaOH solution. The product was collected by filtration, washed with 2.5 L of water and dried under vacuum at 70 C. The product had 1.00 wt % S. A sample of the carbon black product that had been subjected to Soxhlet extraction with methanol had 0.54 wt % S, compared to 0.35 wt % S for the untreated carbon black. The sample thus had attached and adsorbed triazoles.

Example 12—Preparation of a Carbon Black Product

This example illustrates the preparation of a carbon black product of the present invention. A carbon black with an iodine number of 119 and a DBPA of 125 mL/100 g was used. A solution of 2.60 g NaNO2 in 22.5 g of water was added over a period of ten minutes to a stirring mixture of 150 g of the carbon black, 1300 g water, 4.33 g 3-amino-1,2,4-triazole-5-thiol and 5.14 g 70% methanesulfonic acid at 70 C. The mixing was continued for an hour at 70 C. The mixture was cooled to room temperature and adjusted to a pH of 7.5 with NaOH solution. The product was collected by filtration and washed with 2.5 L of water. The product was combined with two additional batches made in substantially the same way. A portion of this mixture was dried under vacuum at 70 C and used for Example 26. The product had 1.49 wt % S. A sample of the carbon black product that had been subjected to Soxhlet extraction with methanol had 0.88 wt % S, compared to 0.65 wt % S for the untreated carbon black. The sample thus had attached and adsorbed triazoles.

Example 13—Preparation of a Carbon Black Product

This example illustrates the preparation of a carbon black product of the present invention. A carbon black with an iodine number of 119 and a DBPA of 125 mL/100 g was used. A solution of 3.91 g NaNO2 in 35.0 g of water was added over a period of five minutes to a stirring mixture of 150 g of the carbon black, 1299 g water, 4.31 g 3-amino-1,2,4-triazole-5-thiol and 7.71 g 70% methanesulfonic acid at 70 C. The mixing was continued for an hour at 70 C. The mixture was cooled to room temperature and adjusted to a pH of 7.5 with NaOH solution. The product was collected by filtration, washed with 2.5 L of water and dried under vacuum at 70 C. The product had 1.45 wt % S. A sample of the carbon black product that had been subjected to Soxhlet extraction with methanol had 1.03 wt % S, compared to 0.65 wt % S for the untreated carbon black. The sample thus had attached and adsorbed triazoles.

Example 14—Preparation of a Carbon Black Product

This example illustrates the preparation of a carbon black product of the present invention. A carbon black with an iodine number of 119 and a DBPA of 125 mL/100 g was used. A solution of 5.21 g NaNO2 in 46.8 g of water was added over a period of ten minutes to a stirring mixture of 150 g of the carbon black, 1300 g water, 4.32 g 3-amino-1,2,4-triazole-5-thiol and 10.3 g 70% methanesulfonic acid at 70 C. The mixing was continued for an hour at 70 C. The mixture was cooled to room temperature and adjusted to a pH of 7.6 with NaOH solution. The product was collected by filtration, washed with 2.5 L of water and dried under vacuum at 70 C. The product had 1.38 wt % S. A sample of the carbon black product that had been subjected to Soxhlet extraction with methanol had 1.30 wt % S, compared to 0.65 wt % S for the untreated carbon black. The sample thus had attached and adsorbed triazoles.

Comparative Example A

This material is the carbon black with an iodine number of 119 and a DBPA of 125 mL/100 g used in Examples 1-9. Intermediate Sample X
A Process All 4HV mixer (4 L) was charged with 600 g of a carbon black with an iodine number of 119 and a DBPA of 125 mL/100 g. The material was mixed for ten minutes and heated to 55-75 C. Aqueous hydrogen peroxide solution (30%, 675 g) was added over 20 min. Mixing was continued for an additional 30 minutes at 75 C. The product was dried overnight in air at 130 C.

Comparative Example B

A 150 g portion of Intermediate Sample X was mixed with 1300 g water. The pH was adjusted to 7.7 with aqueous NaOH solution, filtered and dried under vacuum at 70 C.

Comparative Example C

A suspension of 1302 g water, 150 g carbon black and 100 g Clorox sodium hypochlorite solution was mixed and heated to 90 C. The carbon black had an iodine number of 119 and a DBPA of 125 mL/100 g. Mixing was continued for an hour, and the suspension was cooled to room temperature. The pH was adjusted to 7.5 with aqueous NaOH. The product was collected by filtration, washed with 2.5 L of water and dried under vacuum at 70 C.

Comparative Example D

A solution of 2.62 g NaNO2 in 22.3 g of water was added over a period of ten minutes to a stirring mixture of 150 g of the carbon black, 1300 g water and 6.49 g sulfanilic acid at 70 C. A carbon black with an iodine number of 119 and a DBPA of 125 mL/100 g was used. The mixing was continued for an hour at 70 C. The mixture was cooled to room temperature and adjusted to a pH of 7.4 with an aqueous NaOH solution. The product was subjected to diafiltration until the conductivity of the effluent was 350 µS/cm. The resulting dispersion was dried under vacuum at 70 C. A sample of the carbon black product that had been subjected to Soxhlet extraction with methanol had 1.00 wt % S, compared to 0.65 wt % S for the untreated carbon black.

Comparative Example E

This material is a silicon treated carbon black with an iodine number of 113, a STSA of 128 m2/g, a DBPA of 107 mL/100 g, and a silicon content of 2.64 wt %.

Comparative Example F

A suspension of 1300 g water, 150 g silicon treated carbon black and 100 g Clorox sodium hypochlorite solution was mixed and heated to 90 C. A silicon treated carbon black with an iodine number of 113, a STSA of 128 m2/g, a DBPA of 107 mL/100 g, and a silicon content of 2.64 wt % was used. Mixing was continued for an hour, and the suspension was cooled to room temperature. The pH was adjusted to 7.5 with aqueous NaOH. The product was collected by filtration, washed with 2 L of water and dried under vacuum at 70 C.

Comparative Example G

A suspension of 901 g methanol, 150 g carbon black, and 4.32 g 3-Amino-1,2,4-triazole-5-thiol was mixed for ten minutes. A carbon black with an iodine number of 119 and a DBPA of 125 mL/100 g was used. The solvent was removed with a rotary evaporator and the product was dried under vacuum at 70 C.

Performance Characteristics of Elastomeric Composites

The composition of elastomeric composites prepared using carbon black or carbon black product prepared according to the Examples above are shown in Tables A and B below. In all examples, unless specified otherwise, numerical values represent parts by weight.

The elastomer composites used herein were prepared by mixing Duradene™ 739 polymer with carbon blacks or carbon black products. Duradene™ 739 polymer (Firestone Polymers, Akron Ohio) is a solution polymerized styrene-butadiene copolymer with 20% styrene and 60% vinyl butadiene. The components used in elastomer composites were mixed following a two-stage mixing in Brabender Plasti-corder EPL-V mixer first at a rotor speed of 60 rpm and starting temperature of 80 C followed by the addition of curatives (sulfur ASTM QA purchased from Valasske Mezirici, Czech Republic; Santocure CBS and Perkacit MBT purchased from Solutia, Incorporated St. Louis, Mo.) in the second stage at a rotor speed of 50 rpm and a starting temperature of 50 C. The components in first-stage were mixed for a total of 5 minutes before passing through the open mill three times. The milled compound from first-stage mixing was kept at room temperature for at least 2 h before second stage mixing. The curatives were then mixed in the second stage for 2 minutes.

TABLE A

| Example | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| Duradene 739 | 100 | 100 | 100 | 100 | 100 | 100 | 100 | 100 | 100 | 100 | 100 | 100 | 100 | 100 |
| Carbon product example 1 | 50 | | | | | | | | | | | | | |
| Carbon product example 2 | | 50 | | | | | | | | | | | | |
| Carbon product example 3 | | | 50 | | | | | | | | | | | |
| Carbon product example 4 | | | | 50 | | | | | | | | | | |
| Carbon product example 5 | | | | | 50 | | | | | | | | | |
| Carbon product example 6 | | | | | | 50 | | | | | | | | |
| Carbon product example 7 | | | | | | | 50 | | | | | | | |
| Carbon product example 8 | | | | | | | | 50 | | | | | | |
| Carbon product example 9 | | | | | | | | | 50 | | | | | |
| Carbon product example 10 | | | | | | | | | | 50 | | | | |
| Carbon product example 11 | | | | | | | | | | | 50 | | | |
| Carbon product example 12 | | | | | | | | | | | | 50 | | |
| Carbon product example 13 | | | | | | | | | | | | | 50 | |
| Carbon product example 14 | | | | | | | | | | | | | | 50 |
| Zinc Oxide (ASTM) QA | 3 | 3 | 3 | 3 | 3 | 3 | 3 | 3 | 3 | 3 | 3 | 3 | 3 | 3 |
| Stearic Acid (ASTM) QA | 2 | 2 | 2 | 2 | 2 | 2 | 2 | 2 | 2 | 2 | 2 | 2 | 2 | 2 |
| Santoflex 6PPD | 1 | 1 | 1 | 1 | 1 | 1 | 1 | 1 | 1 | 1 | 1 | 1 | 1 | 1 |
| Sulfur (ASTM) QA | 1.75 | 1.75 | 1.75 | 1.75 | 1.75 | 1.75 | 1.75 | 1.75 | 1.75 | 1.75 | 1.75 | 1.75 | 1.75 | 1.75 |
| Santocure CBS | 1.25 | 1.25 | 1.25 | 1.25 | 1.25 | 1.25 | 1.25 | 1.25 | 1.25 | 1.25 | 1.25 | 1.25 | 1.25 | 1.25 |
| Perkacit MBT | 0.2 | 0.2 | 0.2 | 0.2 | 0.2 | 0.2 | 0.2 | 0.2 | 0.2 | 0.2 | 0.2 | 0.2 | 0.2 | 0.2 |
| Total | 159 | 159 | 159 | 159 | 159 | 159 | 159 | 159 | 159 | 159 | 159 | 159 | 159 | 159 |

TABLE B

| Example | 29 | 30 | 31 | 32 | 33 | 34 | 35 | 36 |
|---|---|---|---|---|---|---|---|---|
| Duradene 739 | 100 | 100 | 100 | 100 | 100 | 100 | 100 | 100 |
| Comparative carbon example A | 50 | | | | | | | 50 |
| Comparative carbon example B | | 50 | | | | | | |
| Comparative carbon example C | | | 50 | | | | | |
| Comparative carbon example D | | | | 50 | | | | |
| Comparative carbon example E | | | | | 51 | | | |
| Comparative carbon example F | | | | | | 51 | | |
| Comparative carbon example G | | | | | | | 50 | |
| 3-amino, 12,4-triazole, 5-thiol | | | | | | | | 1.45 |
| Bis(triethoxysilylpropyl) polysulfide | | | | | 2 | 2 | | |
| Zinc Oxide (ASTM) QA | 3 | 3 | 3 | 3 | 3 | 3 | 3 | 3 |
| Stearic Acid (ASTM) QA | 2 | 2 | 2 | 2 | 2 | 2 | 2 | 2 |
| Santoflex 6PPD | 1 | 1 | 1 | 1 | 1 | 1 | 1 | 1 |
| Sulfur (ASTM) QA | 1.75 | 1.75 | 1.75 | 1.75 | 1.75 | 1.75 | 1.75 | 1.75 |
| Santocure CBS | 1.25 | 1.25 | 1.25 | 1.25 | 1.25 | 1.25 | 1.25 | 1.25 |
| Perkacit MBT | 0.2 | 0.2 | 0.2 | 0.2 | 0.2 | 0.2 | 0.5 | 0.2 |
| Total | 159 | 159 | 159 | 159 | 162 | 162 | 160 | 161 |

Shown in Table I are performance results (relative tan delta and relative abrasion indices at 14% and 21% slip for elastomeric composites that include carbon black products (Examples 15 and 16 of the present invention) in comparison with untreated carbon black (Example 29).

TABLE I

| Example | Relative maximum tan delta | Relative abrasion index at 14% slip | Relative abrasion index at 21% slip |
|---|---|---|---|
| 29 | 100 | 100 | 100 |
| 15 | 78 | 188 | 140 |
| 16 | 92 | 218 | 160 |

Both samples that included modified carbon black (Examples 15 and 16) showed improved (lower) relative maximum tan delta values and increased relative abrasive indices. As discussed above, lower relative maximum tan delta values are desirable, as they reflect reduced heat build up in the elastomer composite when subjected to cyclic strain. A higher relative abrasive index also is desirable and reflects improved abrasion resistance.

In contrast to results obtained using diazonium salts of ATT, the data in Table II pertains to the performance of elastomeric composites that employed a carbon black product modified using diazonium salts of previously disclosed, phenyl-containing agents: 4,4-aminophenyldisulfide (APDS), or 4-aminothiophenol (ATP). Table II also shows performance data for untreated carbon.

TABLE II

| Example | Relative maximum tan delta | Relative abrasion at 14% slip | Relative abrasion at 21% slip |
|---|---|---|---|
| 29 | 100 | 100 | 100 |
| 17 | 72 | 65 | 86 |
| 18 | 85 | 70 | 87 |

Examination of the data presented in Table I and in Table II reveals a considerable improvement in abrasion resistance for carbon black product derived from the diazonium salt of ATT compared to the performance of materials derived from previously known treating agents, while maintaining similar improvements in tan delta. This is believed to be accomplished by the attachment and adsorbing of triazole groups to the filler.

Several experiments were undertaken to investigate performance of elastomeric composites that included carbon black product obtained by using ATT in combination with other treatments.

Table III, for example, shows comparison data for carbon black peroxidized with hydrogen peroxide with or without ATT modification:

TABLE III

| Example | Relative maximum tan delta | Relative abrasion index at 14% slip | Relative abrasion index at 21% slip |
|---|---|---|---|
| 30 | 100 | 100 | 100 |
| 19 | 84 | 116 | 131 |

Table IV shows comparison data for carbon black peroxidized with sodium hypochloride, with or without ATT modification:

TABLE IV

| Example | Relative maximum tan delta | Relative abrasion index at 14% slip | Relative abrasion index at 21% slip |
|---|---|---|---|
| 31 | 100 | 100 | 100 |
| 20 | 72 | 76 | 71 |

Results for elastomeric composites prepared using carbon black treated with the diazonium salt of sulfanilic acid, with or without ATT are shown in Table V:

TABLE V

| Example | Relative maximum tan delta | Relative abrasion index at 14% slip | Relative abrasion index at 21% slip |
|---|---|---|---|
| 32 | 100 | 100 | 100 |
| 21 | 90 | 98 | 100 |
| 22 | 86 | 106 | 107 |
| 23 | 79 | 128 | 127 |

Data for elastomeric composites that employed a starting material that was a dual phase silicon-containing filler (i.e., silicon-treated carbon black) or a preoxidized silicon-containing filler, are shown in Tables VI-A and VI-B, respectively.

TABLE VI-A

| Example | Relative maximum tan delta | Relative abrasion index at 14% slip | Relative abrasion index at 21% slip |
|---|---|---|---|
| 33 | 100 | 100 | 100 |
| 24 | 88 | 103 | 109 |

TABLE VI-B

| Example | Relative maximum tan delta | Relative abrasion index at 14% slip | Relative abrasion index at 21% slip |
|---|---|---|---|
| 34 | 100 | 100 | 100 |
| 25 | 78 | 228 | 193 |

In all cases, the carbon products made from the diazonium salt of ATT had lower tan delta values than the controls. In some cases, modest to strong improvements in wear resistance were found as well.

Experiments also were conducted to compare elastomeric composites that used carbon black product that had the attached triazole group obtained by using diazonium salts of ATT with elastomeric compositions in which ATT is not attached but rather it is physically mixed with carbon black during compounding with rubber, as described in U.S. Pat. No. 6,014,998. Table VII shows performance data obtained using carbon black products prepared according to Examples 12, 13 and 14 as well as carbon blacks from comparative Examples A and G.

Examination of the results presented in Table VII clearly demonstrates that attachment to the carbon black surface according to embodiments disclosed herein (e.g., Examples 26, 27 and 28) specifically improves the desired performance attributes. Furthermore, these Examples show that the attachment level is an important parameter that can be varied to achieve optimal performance in the elastomer composite. Compounds prepared from a carbon black with physically adsorbed ATT (Example 35) showed improvement with abrasion resistance. Results from untreated carbon black with ATT addition during compounding (Example 36) were inferior to those made with carbon black products of the present invention.

TABLE VII

| Example | Relative maximum tan delta | Relative abrasion index at 14% slip | Relative abrasion index at 21% slip |
|---------|----------------------------|--------------------------------------|--------------------------------------|
| 29 | 100 | 100 | 100 |
| 26 | 94 | 168 | 145 |
| 27 | 65 | 185 | 160 |
| 28 | 72 | 185 | 157 |
| 35 | 98 | 114 | 109 |
| 36 | 99 | 90 | 94 |

Example 37: Preparation of 3-amino-1,2,4-triazol-5-yl disulfide

Glacial acetic acid (2.60 g) was added to 4.89 g of a 15% aqueous hydrogen peroxide solution. The resulting solution was added over 20 minutes to a solution prepared from 5.01 g 3-amino-1,2,4-triazole-5-thiol, 65.2 g of water and 4.33 g 40% NaOH. The reaction mixture was kept between 18 C-22 C by use of an ice bath during the addition. After stirring for 75 min, the product was filtered, washed with water and then dried under vacuum at 70 C.

Example 38: Preparation of 3-amino-1,2,4-triazol-5-yl disulfide sulfate salt

Concentrated H2SO4 was added to a stirring mixture of 180.0 g 3-amino-1,2,4-triazole-5-thiol and 2958 g of water. A 30% hydrogen peroxide solution (87.8 g) was added and stirring was continued overnight. A peroxide test strip showed that all of the peroxide was consumed. The product is a solution of 3-amino-1,2,4-triazol-5-yl disulfide hydrogen sulfate.

Example 39: Preparation of 1,2,4-triazol-3-yl disulfide

Glacial acetic acid (7.89 g) was added to 18.7 g of a 15% aqueous hydrogen peroxide solution. The resulting solution was added slowly to a solution prepared from 16.5 g 1,2,4-triazole-3-thiol, 160 g of water and 16.3 g 40% NaOH. The reaction temperature was moderated with the use of an ice bath during the addition. After stirring overnight at room temperature, the product was filtered, washed with water and then dried under vacuum at 70 C.

Examples 40 to 45: Preparation of Modified Fillers

These examples illustrate the preparation of the modified filler of the present invention with an adsorbed group. A carbon black with an iodine number of 119 and a DBPA of 125 mL/100 g was used. The compound listed was dissolved in about 1 L of solvent and mixed with 150 g of the carbon black for about 15 minutes. The solvent was then removed with a rotary evaporator and dried under vacuum at 70 C. Portions of some samples were subjected to Soxhlet extraction overnight with methanol, and analyzed for sulfur to confirm adsorption. The resulting S analysis showed that the adsorbed compounds were nearly completely removed, thus confirming adsorption and not attachment.

| Example | Compound | Amount, g | Solvent |
|---------|----------|-----------|---------|
| 40 | 3-amino-1,2,4-triazole-5-thiol | 4.33 | Methanol |
| 41 | 3-amino-1,2,4-triazole-5-thiol | 4.31 | Methanol |
| 42 | 3-amino-1,2,4-triazol-5-yl disulfide | 4.32 | Methanol |
| 43 | 3-amino-1,2,4-triazol-5-yl disulfide | 4.33 | Methanol |
| 44 | 1,2,4-triazole-3-thiol | 3.78 | Methanol |
| 45 | 1,2,4-triazol-3-yl disulfide | 3.76 | Methanol |

Example 46: Preparation of a Modified Filler

A mixture of 5.00 g 3-amino-1,2,4-triazol-5-yl disulfide, 0.70 g sulfur and 5.34 g N-methyl pyrrolidone was heated to 100 C with stirring. Some solid material was broken up with a spatula as the sample heated. All of the sulfur had reacted after heating at 100 C for an hour. The sample was cooled and the resulting solid was washed with 5 g of water and dried. HPLC/MS analysis showed that the product, 3-amino-1,2,4-triazol-5-yl trisulfide, also contained 3-amino-1,2,4-triazol-5-yl disulfide and 3-amino-1,2,4-triazole-5-thiol. The product (8.67 g and 52% non-volatile material) was dissolved in hot dimethylformamide and mixed with 137 g of a carbon black with an iodine number of 119 and a DBPA of 125 mL/100 g. After stirring for about 15 min, the mixture was cooled to room temperature and filtered. The solids were washed three times with 1 L of water and dried under vacuum at 70 C. Adsorbed groups were confirmed to be on the filler.

Example 47: Preparation of a Modified Filler

4-Amino-3-hydrazino-1,2,4-triazole-5-thiol (5.48 g) was dissolved in a solution of 1 L water and 3.0 g NaOH. A carbon black (150 g) with an iodine number of 119 and a DBPA of 125 mL/100 g was added, and the mixture was stirred. The pH was reduced to 7.2 on addition of 7.2 g concentrated sulfuric acid. The mixture was filtered, washed with about 3.5 L of water and dried under vacuum at 70 C. Absorbed groups were confirmed to be on the filler.

Example 48: Preparation of a Modified Filler

This example illustrates the preparation of a modified filler of the present invention, having a PAH 22 content of 25 ppm compared to a PAH 22 content of 710 ppm for a reference carbon black. The carbon black had an iodine number of 137 and a DBPA of 120 mL/100 g. A mixture of the 150 g of the carbon black, 4.32 g of 3-amino-1,2,4-triazol-5-yl disulfide and 1 L of methanol was stirred for 15 minutes. The methanol was removed on a rotary evaporator, and the product was dried under vacuum at 70° C. Absorbed groups were confirmed to be on the filler.

Example 49: Preparation of a Modified Filler

A 20 L Ross mixer was charged with 11.26 kg of water and 3.00 kg of carbon black and 1543 g of a 0.243 mmol/g solution of 3-amino-1,2,4-triazol-5-yl disulfide sulfate salt. The carbon black had an iodine number of 119 and a DBPA of 125 mL/100 g. After heating to 70° C., 259 g of a 20% solution of NaNO$_2$ in water was added over 10 min. The mixture was allowed to stir at 70° C. for an hour, and was cooled to room temperature. An aqueous 40% NaOH solution (37.6 g) was added and the mixture was stirred an additional 5 min. The mixture was filtered, and the product was washed with water until the conductivity was about 5000 uS/cm. The product was dried at 100° C. The product had 1.35 wt % S. A sample of the modified carbon black product that had been subjected to Soxhlet extraction with methanol overnight had 1.04 wt % S, compared to 0.75 wt % S for the untreated carbon black. The sample thus had attached and adsorbed triazoles.

Example 50: Preparation of a Modified Filler

This modified carbon black product was prepared by substantially the same method as in Example 49.

Example 51: Preparation of a Modified Filler

This example illustrates the preparation of a modified filler of the present invention. A batch pelletizer having a mixing chamber with a 8" diameter and 8" length was heated to 50 C and charged with 224 g of a fluffy carbon black with an iodine number of 149 and a DBPA of 125 mL/100 g. Water (17 g) and 132 g of a 0.235 mmol/g solution of 3-amino-1,2,4-triazol-5-yl disulfide sulfate salt was added and the mixture was mixed at 500 rpm for 1 minute. A 4.21 wt % solution of $NaNO_2$ (107 g) was sprayed in and processing was continued for an additional 5 min. The product was dried in an oven at 100° C. A sample of the modified carbon black product that had been subjected to Soxhlet extraction with methanol overnight had 0.79 wt % S, compared to 0.47 wt % S for the untreated carbon black. The sample had attached and adsorbed triazoles.

Example 52: Preparation of a Modified Filler

This example illustrates the preparation of a modified filler of the present invention. A carbon black with an iodine number of 70 and a DBPA of 118 mL/100 g was used. A solution of 1.56 g $NaNO_2$ in 13.2 g of water was added over a period of about five minutes to a stirring mixture of 150 g of the carbon black, 1300 g water and 47.5 g of a 0.241 mmol/g solution of 3-amino-1,2,4-triazol-5-yl disulfide sulfate salt at 70 C. The mixing was continued for 65 minutes at 70° C. The mixture was cooled to room temperature and adjusted to a pH of 7.4 with 1.28 g of 40% aqueous NaOH solution. The product was collected by filtration, washed with 2 L of water and dried under vacuum at 70° C. The carbon black product (120.0 g) was suspended in 663 g of methanol, and 3.4 g of 3-amino-1,2,4-triazol-5-yl disulfide was added. After stirring for 15 min, the methanol was removed on a rotary evaporator, and the product was dried under vacuum at 70° C. A sample of the modified carbon black product that had been subjected to Soxhlet extraction with methanol overnight had 1.41 wt % S, compared to 1.31 wt % S for the untreated carbon black. The sample thus had attached and adsorbed triazoles.

Example 53: Preparation of a Modified Filler

This example illustrates the preparation of a modified carbon black product of the present invention. It had a PAH 22 content of 25 ppm compared to a PAH 22 content of 710 ppm for a reference carbon black. The carbon black had an iodine number of 137 and a COAN of 120 mL/100 g. A solution of 2.60 g $NaNO_2$ in 24.7 g of water was added over a period of six minutes to a stirring mixture of 150 g of the carbon black, 1300 g water, 4.31 g 3-amino-1,2,4-triazol-5-yl disulfide and 5.14 g 70% methanesulfonic acid at 70° C. The mixing was continued for 66 minutes at 70° C. The mixture was cooled to room temperature. The product was collected by filtration, washed with 2.5 L of water and dried under vacuum at 70° C. A sample of the modified carbon black product that had been subjected to Soxhlet extraction with methanol overnight had 0.77 wt % S, compared to 0.48 wt % S for the untreated carbon black. The sample had attached and adsorbed triazoles.

Example 54: Preparation of a Carbon Black Product

This example illustrates the preparation of a modified carbon black product of the present invention. A suspension of 1302 g water, 150 g carbon black and 100 g Clorox sodium hypochlorite solution was mixed and heated to 90 C. The carbon black had an iodine number of 119 and a DBPA of 125 mL/100 g. Mixing was continued for 60 minutes, and the suspension was cooled to 70 C. The product was collected by filtration, washed with 2.5 L of water and dried under vacuum at 70 C. 3-Amino-1,2,4-triazol-5-yl disulfide (3.44 g) was dissolved in about 0.8 L of solvent and mixed with 120 g of the carbon black for about 15 minutes. The solvent was then removed with a rotary evaporator and dried under vacuum at 70 C. Portions of the sample was subjected to Soxhlet extraction overnight with methanol, and analyzed for sulfur. The resulting S analysis shows that the compound could be nearly completely removed, and thus the triazole was adsorbed on the filler.

Example 55: Preparation of a Modified Silicon Treated Carbon Black Product

This example illustrates the preparation of a modified silicon treated carbon black product of the present invention. A silicon treated carbon black with an iodine number of 64, a STSA of 120 m2/g, a DBPA of 157 mL/100 g, and a silicon content of 10 wt % was used. The silicon treated carbon black (150 g) was stirred for 15 min with a solution of 4.31 g 3-amino-1,2,4-triazol-5-yl disulfide in about 1 L of methanol. The solvent was removed on a rotary evaporator, and the product was dried under vacuum at 70° C. Adsorbed groups were confirmed on the filler.

Example 56: Preparation of a Modified Silica Product

This example illustrates the preparation of a modified silica product of the present invention. Zeosil 1165 silica (a product of Rhodia) was stirred for 15 min with a solution of 7.93 g 3-amino-1,2,4-triazol-5-yl disulfide in about 1 L of methanol. The solvent was removed on a rotary evaporator, and the product was dried under vacuum at 70° C. Adsorbed groups were confirmed to be on the filler.

Examples 57 to 66: Preparation of Modified Fillers

In these examples, a carbon black with an iodine number of 119 and a DBPA of 125 mL/100 g was used. A 10 wt % solution of $NaNO_2$ in water was added over a period of about five minutes to a stirring mixture of 300 g of the carbon black, 2600 g water, the indicated compound and 70% methanesulfonic acid at 70° C. The mixing was continued for about an hour at 70° C. The mixture was cooled to room temperature. As indicated in the table, some products were purified by filtration followed by water washing (A) or water washing followed by ethanol and then water washes (B). Some products were purified by centrifugation with two or three exchanges with water (C) or water followed by ethanol and then water (D). The products were dried under vacuum at 70° C. The products had attached organic groups.

| Ex. | Compound | Weight of compound, g | Weight of 70% CH$_3$SO$_3$H, g | Weight of NaNO$_2$, g | purification |
|---|---|---|---|---|---|
| 57 | 3-amino-1,2,4-triazole | 6.31 | 10.3 | 5.17 | Filter (A) |
| 58 | 3-amino-1,2,4-triazole | 12.6 | 20.6 | 10.34 | Centrifuge (C) |
| 59 | 3-amino-1,2,4-triazole | 18.9 | 139.7 | 15.5 | Centrifuge (C) |
| 60 | 4-4'-amino-phenyldisulfide | 9.31 | 10.3 | 5.18 | Filter (B) |
| 61 | 4-(trifluoro-methyl)aniline | 12.1 | 10.3 | 5.16 | Filter (B) |
| 62 | 4-aminobenzamide | 10.2 | 10.3 | 5.17 | Centrifuge (C) |
| 63 | 4-pentylaniline | 12.2 | 10.3 | 5.17 | Filter (B) |
| 64 | 4-pentylaniline | 24.4 | 20.6 | 10.4 | Filter (B) |
| 65 | 4-pentylaniline | 36.7 | 30.9 | 15.5 | Filter (B) |
| 66 | 4-aminobenzoic acid | 10.3 | 20.6 | 5.18 | Centrifuge (D) |

Examples 67 to 76: Preparation of Modified Fillers

In these examples of the present invention, 3-amino-1,2,4-triazol-5-yl disulfide was adsorbed on carbon black products having attached groups from Examples 57 to 66. In each case, the carbon black product was stirred with a solution of 4.3 g of 3-amino-1,2,4-triazol-5-yl disulfide in 1 L of ethanol for 15 minutes. The ethanol was removed on a rotary evaporator, and the product was dried under vacuum at 70° C.

| Example | Carbon product with attached organic groups, from listed Example |
|---|---|
| 67 | 57 |
| 68 | 58 |
| 69 | 59 |
| 70 | 60 |
| 71 | 61 |
| 72 | 62 |
| 73 | 63 |
| 74 | 64 |
| 75 | 65 |
| 76 | 66 |

Example 77: Preparation of a Modified Filler

This example illustrates the preparation of a modified filler of the present invention. A carbon black with an iodine number of 119 and a DBPA of 125 mL/100 g was used. A solution of 3.88 g NaNO$_2$ in 35.3 g of water was added over a period of about ten minutes to a stirring mixture of 150 g of the carbon black, 1300 g water, 6.86 g 4-aminobenzylamine and 17.05 g of 70% methanesulfonic acid at 70 C. The mixing was continued for 60 minutes at 70° C. The mixture was cooled to room temperature and adjusted to a pH of 8.4 with 5.44 g of 40% aqueous NaOH solution. The product was collected by filtration, washed with 2.5 L of water and dried under vacuum at 70° C. The carbon black product (120.1 g) was suspended in 660 g of methanol, and 3.47 g of 3-amino-1,2,4-triazol-5-yl disulfide was added. After stirring for 15 min, the methanol was removed on a rotary evaporator, and the product was dried under vacuum at 70° C. Adsorbed groups were confirmed to be on the filler.

Example 78: Preparation of Benzoimidazol-2-yl disulfide

A solution prepared from 10.0 g 2-mercaptobenzoimidazole, 88 g ethanol and 6.68 g 40% aqueous NaOH was mixed with a solution of 8.54 g iodine in 79 g of ethanol. The resulting mixture was filtered, and the collected product was washed with ethanol and dried under vacuum at 70° C.

Example 79: Preparation of 2-amino-1,3,4-thiadiazol-5-yl disulfide

A solution prepared from 10.0 g 2-amino-1,3,4-thiadiazole-5-thiol, 81 g ethanol and 7.78 g 40% aqueous NaOH was mixed with a solution of 9.48 g iodine in 75 g of ethanol. The resulting mixture was filtered, and the collected product was washed with ethanol and dried under vacuum at 70° C.

Example 80: Preparation of 1,2,3-triazole-4-thiol

Concentrated HCl (12.06 g) was added to a solution of 14.98 g 5-mercapto-1,2,3-triazole sodium salt in 104 g of ethanol. Solids were removed by filtration and the resulting solution of 1,2,3-triazole-4-thiol was used directly.

Example 81: Preparation of (1,2,4-triazol-3-ylmethyl)disulfide

3-Chloromethyl-1,2,4-triazole was prepared by a method similar to that described in J. Am. Chem. Soc. 77 1540 (1955). The 3-chloromethyl-1,2,4-triazole was reacted with 1 equivalent of thiourea in 30 parts by volume of refluxing ethanol for 15 hr by a method similar to that described in WO2008151288. The reaction product was hydrolyzed with 12% aqueous NaOH for 20 min at 50° C. Addition of 0.5 eq of I2 and NaI gave (1,2,4-triazol-3-ylmethyl)disulfide.

Comparative Example 82

This material is the carbon black with an iodine number of 70 and a DBPA of 118 mL/100 g used in Example 52.

Comparative Example 83

This material is the carbon black with an iodine number of 149 and a DBPA of 125 mL/100 g used in Example 51 that has been pelletized with water and dried at 100° C.

Comparative Example 84

This material is the silicon treated carbon black with an iodine number of 64, a STSA of 120 m2/g. a DBPA of 157 mL/100 g and a silicon content of 10% that was used in Example 55.

Comparative Example 85

This is the Zeosil 1165 silica used in Example 56.

Comparative Example 86

This material is the carbon black used in Example 53. It had a PAH 22 content of 25 ppm compared to a PAH 22 content of 710 ppm for a reference carbon black. The carbon black had an iodine number of 137 and a COAN of 120 mL/100 g.

Comparative Example 87

A dry mixture of 4.31 g 3-amino-1,2,4-triazol-5-yl disulfide and 150 g of a carbon black with an iodine number of 119 and a DBPA of 125 mL/100 g were mixed in a Waring blender for 30 seconds.

Examples 88 to 100: Preparation of Materials

These examples illustrate the preparation of various materials. A carbon black with an iodine number of 119 and a DBPA of 125 mL/100 g was used. The compound listed was dissolved in about 1 L of solvent and mixed with 150 g of the carbon black for about 15 minutes. The solvent was then removed with a rotary evaporator and dried under vacuum at 70 C.

| Example | Compound | Amount, g | Solvent |
|---|---|---|---|
| 88 (comparative) | 3-Amino-5-methylthio-1,2,4-triazole | 4.90 | Methanol |
| 89 (comparative) | 4,4'-Aminophenyl disulfide | 4.66 | Methanol |
| 90 (comparative) | 3-Amino-1,2,4-triazole | 3.15 | Methanol |
| 91 (comparative) | 1,2,4-Triazole | 2.59 | Methanol |
| 92 (comparative) | 1,2,3 Triazole | 2.59 | Methanol |
| 93 (comparative) | 1,2,3-triazole-4-thiol | 3.74 | Ethanol |
| 94 (comparative) | 2-Mercaptobenzothiazole | 6.26 | CH2Cl2 |
| 95 (comparative) | 2-Mercaptobenzoimidazole | 5.62 | Methanol |
| 96 (comparative) | 1,2,3-triazol-4-yl disulfide | 3.20 | Methanol |
| 97 (comparative) | 2,5-Dimercaptol,3,4 thiadiazole | 5.62 | Methanol |
| 98 (comparative) | 2-Amino-5-mercapto-1,3,4-thiadiazole | 4.99 | Acetone |
| 99 (present invention) | (1,2,4-triazol-3-ylmethyl) disulfide | 4.28 | Methanol |
| 100 (comparative) | Benzotriazole | 4.47 | Methanol |

Example 101: Preparation of a Comparative Material

This example illustrates the preparation of a comparative material. A carbon black with an iodine number of 119 and a DBPA of 125 mL/100 g was used. Benzoimidazol-2-yl disulfide (5.62 g) was dissolved in about 1 L of hot dimethylformamide and mixed with 150 g of the carbon black for about 15 minutes. The mixture was cooled, and filtered. The product was washed three times with water and dried under vacuum at 70° C.

Example 102: Preparation of a Comparative Material

This example illustrates the preparation of a comparative material. A carbon black with an iodine number of 119 and a DBPA of 125 mL/100 g was used. 2-Amino-1,3,4-thiadiazoly-5-yl disulfide (4.95 g) was dissolved in about 700 mL of dimethylsulfoxide and mixed with 150 g of the carbon black for about 15 minutes. Water (500 g) was added and the mixture was stored in a refrigerator for three days. The mixture was filtered, washed with 4 L of water and dried under vacuum at 70° C.

Example 103: Preparation of a Comparative Material

This example illustrates the preparation of a comparative carbon black product. A carbon black with an iodine number of 119 and a DBPA of 125 mL/100 g was used. A solution of 2.59 g $NaNO_2$ in 21.3 g of water was added over a period of five minutes to a stirring mixture of 150 g of the carbon black, 1300 g water, 4.33 g 3-amino-1,2,4-triazol-5-yl disulfide and 5.15 g 70% methanesulfonic acid at 70° C. The mixing was continued for 65 min at 70° C. The mixture was cooled to room temperature. The product was collected by filtration, washed with 3 L of water, 2 L of methanol and dried under vacuum at 70° C. The product has 1.06 wt % S. A sample of the carbon black product that had been subjected to Soxhlet extraction with methanol had 0.97 wt % S, compared to 0.75 wt % S for the untreated carbon black. Thus, the sample has attached triazoles and residual extractable material remaining on the surface.

Performance Characteristics of Elastomeric Composites.

The following examples relate to the use of the modified fillers of the present invention or comparative fillers in elastomeric formulations to form elastomeric composites. Several different elastomeric formulations were used, depending upon the filler. Unless stated otherwise, the method of preparing the elastomeric composites was the same as in Examples 15-36 described earlier.

Formulations (in phr, Unless Stated Otherwise):

Formulation AA (Formulation AA was used for examples 29, 40, 42, 45, 88, 82, 52, 41, 43, 54, 89, 90, 46, 102, 87, 91-96, 47, 97, 98, 44, 49, 57, 67, 58, 68, 59, 69, 60, 70, 61, 71, 62, 72, 63, 73, 64, 74, 65, 75, 66, 76, 77, 83, 51, 86, 53, 48, 100, 102, 103, and 99, where carbon black was used as the filler or the filler that was modified)

| | |
|---|---|
| Duradene 739 | 100 |
| Carbon Black (of indicated Example #) | 50 |
| Zinc oxide | 3 |
| Stearic acid | 2 |
| Santoflex 6PPD | 1 |
| Sulfur | 1.75 |
| Santocure CBS | 1.25 |
| Perkacit MBT | 0.2 |

Formulation BB (Formulation BB was used for examples Table XIV for ATT and ATT2 wherein the chemical group (the triazole) was added during compounding as a comparative)

These Samples Had Triazoles Added During Compounding:

| Formulation BB | #1 | #2 |
|---|---|---|
| Duradene 739 | 100 | 100 |
| Carbon Black (of indicated Example #) | 50 | 50 |
| 3-amino-1,2,4-triazole-5-thiol | 1.45 | |
| 3-amino-1,2,4-triazol-5-yl disulfide | | 1.44 |
| Zinc oxide | 3 | 3 |
| Stearic acid | 2 | 2 |
| Santoflex 6PPD | 1 | 1 |

-continued

| Formulation BB | #1 | #2 |
|---|---|---|
| Sulfur | 1.75 | 1.75 |
| Santocure CBS | 1.25 | 1.25 |
| Perkacit MBT | 0.2 | 0.2 |

Formulation CC
(Formulation CC was used for Examples 85, 56, 84, and 55, where the filler was silica or silicon-treated carbon black (the present invention or comparatives thereof)

| Formulation CC | #1 | #2 | #3 | #4 |
|---|---|---|---|---|
| Duradene 739 | 100 | 100 | 100 | 100 |
| SiO2 (Ex. 85) | 56 | | | |
| Ex. 56 | | 56 | | |
| Silicon-treated filler (Ex. 84) | | | 50 | |
| Ex. 55 | | | | 50 |
| bis(triethoxysilylpropyl)polysulfide | 4.48 | 4.48 | 2 | 2 |
| Zinc oxide | 3 | 3 | 3 | 3 |
| Stearic acid | 2 | 2 | 2 | 2 |
| Santoflex 6PPD | 1 | 1 | 1 | 1 |
| Sulfur | 1.5 | 1.5 | 1.5 | 1.5 |
| Santocure CBS | 1.7 | 1.7 | 1.4 | 1.4 |
| Diphenylguanidine (DPG) | 1.5 | 1.5 | 0.7 | 0.7 |

Table VIII provides performance results (relative tan delta and relative abrasion indices at 14% and 21% slip for elastomeric composites that include modified fillers of the present invention having an adsorbed compound of 3-amino-1,2,4-triazole-5-thiol or 3-amino-1,2,4-triazol-5-yl-disulfide in comparison with unmodified carbon black (Example 29).

TABLE VIII

| Example | Relative maximum tan delta | Relative abrasion index at 14% slip | Relative abrasion index at 21% slip |
|---|---|---|---|
| 29 | 100 | 100 | 100 |
| 40 | 93 | 183 | 143 |
| 42 | 94 | 173 | 145 |

Both samples that included the modified carbon black (Examples) showed improved (lower) relative tan delta values and increased relative abrasive indices. As discussed above, lower relative tan delta values are desirable, as they reflect reduced heat build up in the elastomer composite when subjected to cyclic strain. A higher relative abrasive index also is desirable and reflects improved abrasion resistance.

Table IX provides performance results (relative tan delta and relative abrasion indices at 14% and 21% slip for elastomeric composites that include a carbon black product of the present invention having an adsorbed compound of 1,2,4-triazol-3-yl-disulfide in comparison with an unmodified carbon black (Example 29) and a comparative carbon black product having an adsorbed compound not of 1,2,4-triazol-3-yl-disulfide.

TABLE IX

| Example | Relative maximum tan delta | Relative abrasion index at 14% slip | Relative abrasion index at 21% slip |
|---|---|---|---|
| 29 | 100 | 100 | 100 |
| 45 | 105 | 233 | 206 |
| 88 (comparative) | 106 | 69 | 67 |

The sample that included a modified carbon black having an adsorbed compound of 1,2,4-triazol-3-yl-disulfide of the present invention showed substantially improved increased relative abrasive indices and tan delta value similar to the controls. The comparative carbon black product having an adsorbed compound not of 1,2,4-triazol-3-yl-disulfide had substantially depressed abrasion index results.

Table X provides performance results (relative tan delta and relative abrasion indices at 14% and 21% slip for elastomeric composites that include silica products of the present invention having an adsorbed compound of 3-amino-1,2,4-triazol-5-yl-disulfide in comparison with an unmodified silica (Example 85).

TABLE X

| Example | Relative maximum tan delta | Relative abrasion index at 14% slip | Relative abrasion index at 21% slip |
|---|---|---|---|
| 85 (Silica) | 100 | 100 | 100 |
| 56 | 114 | 150 | 179 |

The sample that included a modified silica having the adsorbed compound of the present invention showed substantially improved increased relative abrasion indices and only modest tan delta values increases relative to the control.

Table XI provides performance results (relative tan delta and relative abrasion indices at 14% and 21% slip for elastomeric composites that include a modified silicon treated carbon black product of the present invention having an adsorbed compound of 3-amino-1,2,4-triazol-5-yl-disulfide in comparison with an unmodified silicon treated carbon black product (Example 84).

TABLE XI

| Example | Relative maximum tan delta | Relative abrasion index at 14% slip | Relative abrasion index at 21% slip |
|---|---|---|---|
| 84 (silicon-treated carbon black | 100 | 100 | 100 |
| 55 | 95 | 140 | 147 |

The sample that included a modified silicon treated carbon black product having the adsorbed compound of the present invention showed substantially improved increased relative abrasion indices relative to the control.

Table XII provides performance results (relative tan delta and relative abrasion indices at 14% and 21% slip for elastomeric composites that include a modified carbon black product of the present invention having an adsorbed compound of 3-amino-1,2,4-triazol-5-yl-disulfide and attached organic groups in comparison with unmodified carbon blacks (Example 82).

TABLE XII

| Example | Relative maximum tan delta | Relative abrasion index at 14% slip | Relative abrasion index at 21% slip |
|---|---|---|---|
| 82 | 100 | 100 | 100 |
| 52 | 86 | 178 | 155 |
| 29 | 158 | 149 | 133 |

The sample that included a modified carbon black product of the present invention having the adsorbed compound and attached organic groups showed substantially improved increased relative abrasion indices and tan delta value improvements relative to the control using the same filler. Furthermore, the modified carbon black product of the present invention having the adsorbed compound and attached organic groups had improved increased relative abrasion indices and substantial tan delta improvements relative to an untreated carbon black (Example 29) commonly used for tread compounds.

Table XIII provides performance results (relative tan delta and relative abrasion indices at 14% slip for elastomeric composites that include carbon black products of the present invention having an adsorbed compound in comparison with an unmodified carbon black (Example 29) and comparative carbon black products having a different adsorbed compound.

TABLE XIII

| Example | Relative maximum tan delta | Relative abrasion index at 14% slip | Relative abrasion index at 21% slip |
|---|---|---|---|
| 29 | 100 | 100 | 100 |
| 41 | 100 | 201 | 156 |
| 43 | 96 | 172 | 143 |
| 54 | 99 | 165 | 140 |
| 89 (comparative) | 111 | 104 | 96 |
| 90 (comparative) | 99 | 89 | 79 |

The samples that included a modified carbon black having the adsorbed compound of the present invention showed substantially improved increased relative abrasive indices relative to the control. The sample that included an oxidized black having the adsorbed compound of the present invention showed substantially improved increased relative abrasive indices relative to the control containing the unmodified carbon black. The comparative carbon black product having a different adsorbed compound had substantially unchanged or depressed abrasion index results.

Table XIV provides performance results (relative tan delta and relative abrasion indices at 14% and 21% slip for elastomeric composites that include an unmodified carbon black (Example 29) and compounds in which 3-amino-1,2,4-triazole-5-thiol was added to the mixer without preadsorption on the carbon black.

TABLE XIV

| Example | Relative maximum tan delta | Relative abrasion index at 14% slip | Relative abrasion index at 21% slip |
|---|---|---|---|
| 29 | 100 | 100 | 100 |
| Add ATT2 during compounding (Form. BB #2) | 94 | 79 | 85 |
| Add ATT during compounding (Form. BB #1) | 98 | 85 | 94 |

As shown, the addition of compounds directly to the mixer without preadsorption on carbon black resulted in compounds with poor abrasion index values.

Table XV provides performance results (relative tan delta and relative abrasion indices at 14% and 21% slip for elastomeric composites that include a carbon black product of the present invention having the adsorbed compound in comparison with a comparative carbon black product having a different adsorbed compound, an unmodified carbon black (Example 29), and a compound in which the compound is previously dry mixed with carbon black, but without preadsorption on the carbon black.

TABLE XV

| Example | Relative maximum tan delta | Relative abrasion index at 14% slip | Relative abrasion index at 21% slip |
|---|---|---|---|
| 29 | 100 | 100 | 100 |
| 46 | 83 | 159 | 122 |
| 102 (comparative) | 107 | 86 | 64 |
| 87 (comparative) | 97 | 81 | 69 |

The sample that included the modified carbon black having the adsorbed compound of the present invention showed substantially improved increased relative abrasive indices and an improved tan delta value relative to the control. The comparative carbon black product having a different adsorbed compound had depressed abrasion index results. Previous dry mixing of the compound with the carbon black without adsorption resulted in a compound with poor abrasion index values.

Table XVI provides performance results (relative tan delta and relative abrasion indices at 14% and 21% slip for elastomeric composites that include an unmodified carbon black (Example 29) and comparative carbon black products having an adsorbed compound.

TABLE XVI

| Example | Relative maximum tan delta | Relative abrasion index at 14% slip | Relative abrasion index at 21% slip |
|---|---|---|---|
| 29 | 100 | 100 | 100 |
| 91 (comparative) | 103 | 86 | 92 |
| 92 (comparative) | 106 | 90 | 92 |
| 93 (comparative) | 75 | 81 | 109 |

The comparative carbon black products having an adsorbed compound had depressed abrasion index results or results similar to that of the untreated carbon black.

Table XVII provides performance results (relative tan delta and relative abrasion indices at 14% and 21% slip) for elastomeric composites that include comparative carbon black products having an adsorbed compound in comparison with an unmodified carbon black (Example 29).

TABLE XVII

| Example | Relative maximum tan delta | Relative abrasion index at 14% slip | Relative abrasion index at 21% slip |
|---|---|---|---|
| 29 | 100 | 100 | 100 |
| 94 (comparative) | 79 | 91 | 96 |
| 95 (comparative) | 100 | 67 | 71 |
| 96 (comparative) | 81 | 73 | 90 |

The comparative carbon black products having an adsorbed compound had depressed abrasion index results.

Table XVIII provides performance results (relative tan delta and relative abrasion indices at 14% slip for elastomeric composites that include a modified carbon black product of the present invention having an adsorbed compound in comparison with an unmodified carbon black (Example 29) and comparative carbon black products having a different adsorbed compound.

TABLE XVIII

| Example | Relative maximum tan delta | Relative abrasion index at 14% slip |
|---|---|---|
| 29 | 100 | 100 |
| 47 | 97 | 215 |
| 97 (comparative) | 75 | 57 |
| 98 (comparative) | 89 | 79 |

The sample that included a modified carbon black having the adsorbed compound of the present invention showed a substantially improved increased relative abrasive index and tan delta value similar to the controls. The comparative carbon black products having a different adsorbed compound had depressed abrasion index results Table XIX provides performance results (relative tan delta and relative abrasion indices at 14% and 21% slip) for elastomeric composites that include a carbon black product of the present invention having an adsorbed compound in comparison with unmodified carbon black (Example 29).

TABLE XIX

| Example | Relative maximum tan delta | Relative abrasion index at 14% slip | Relative abrasion index at 21% slip |
|---|---|---|---|
| 29 | 100 | 100 | 100 |
| 44 | 124 | 157 | 136 |

The sample that included the modified carbon black of the present invention showed improved relative abrasive indices.

Table XX provides performance results (relative tan delta and relative abrasion indices at 14% and 21% slip for elastomeric composites that include a carbon black product of the present invention having attached organic groups and an adsorbed compound in comparison with unmodified carbon black (Example 29).

TABLE XX

| Example | Relative maximum tan delta | Relative abrasion index at 14% slip | Relative abrasion index at 21% slip |
|---|---|---|---|
| 29 | 100 | 100 | 100 |
| 49 | 69 | 236 | 181 |

The sample that included the modified carbon black of the present invention showed improved tan delta performance and improved relative abrasion indices.

Table XXI provides performance results (relative tan delta and relative abrasion indices at 14% and 21% slip for elastomeric composites that include modified carbon black products of the present invention having an adsorbed compound and attached organic groups in comparison with an unmodified carbon black and carbon blacks having attached organic groups but no adsorbed compounds.

TABLE XXI

| Example | Relative maximum tan delta | Relative abrasion index at 14% slip | Relative abrasion index at 21% slip |
|---|---|---|---|
| 29 | 100 | 100 | 100 |
| 57 | 95 | 79 | 78 |
| 67 | 93 | 139 | 125 |
| 58 | 83 | 69 | 69 |
| 68 | 91 | 127 | 112 |
| 59 | 74 | 59 | 69 |
| 69 | 89 | 83 | 89 |
| 60 | 81 | 83 | 95 |
| 70 | 71 | 178 | 160 |
| 61 | 107 | 72 | 72 |
| 71 | 98 | 184 | 129 |

The samples that included a modified carbon black product of the present invention having the adsorbed compound and attached organic groups (Examples 67-71) showed improved increased relative abrasion indices relative to the carbon blacks having only the same attached organic group.

Table XXII provides performance results (relative tan delta and relative abrasion indices at 14% and 21% slip for elastomeric composites that include modified carbon black products of the present invention having an adsorbed compound and attached organic groups in comparison with an unmodified carbon black and carbon blacks having attached organic groups, but no adsorbed compounds.

TABLE XXII

| Example | Relative maximum tan delta | Relative abrasion index at 14% slip | Relative abrasion index at 21% slip |
|---|---|---|---|
| 29 | 100 | 100 | 100 |
| 62 | 116 | 105 | 76 |
| 72 | 109 | 130 | 89 |
| 63 | 104 | 115 | 77 |
| 73 | 91 | 167 | 105 |
| 64 | 93 | 63 | 60 |
| 74 | 100 | 94 | 73 |
| 65 | 104 | 53 | 49 |
| 75 | 89 | 78 | 56 |
| 66 | 101 | 116 | 76 |
| 76 | 84 | 142 | 101 |

The samples that included a modified carbon black product of the present invention having the adsorbed compound and attached organic groups (Examples 72-76) showed improved increased relative abrasion indices relative to the carbon blacks having only the same attached organic group.

Table XXIII provides performance results (relative tan delta and relative abrasion indices at 14% and 21% slip for elastomeric composites that include a modified carbon black product of the present invention having an adsorbed compound and attached organic groups in comparison with an unmodified carbon black.

TABLE XXIII

| Example | Relative maximum tan delta | Relative abrasion index at 14% slip | Relative abrasion index at 21% slip |
|---|---|---|---|
| 29 | 100 | 100 | 100 |
| 77 | 67 | 209 | 178 |

The sample that included a modified carbon black product of the present invention having the adsorbed compound and attached organic groups showed an improved decreased tan delta value and improved increased relative abrasion indices relative to those of the unmodified carbon black.

Table XXIV provides performance results (relative tan delta and relative abrasion indices at 14% % slip for elastomeric composites that include a modified carbon black product of the present invention having attached organic groups and an adsorbed compound in comparison with unmodified carbon black.

TABLE XXIV

| Example | Relative maximum tan delta | Relative abrasion index at 14% slip |
|---|---|---|
| 83 (comparative) | 100 | 100 |
| 51 | 91 | 184 |

The sample that included the modified carbon black showed improved tan delta performance and improved relative abrasion indices.

Table XXV provides performance results (relative tan delta and relative abrasion indices at 14% relative slip) for elastomeric composites that include a modified carbon black product of the present invention having an adsorbed compound in addition to having attached organic groups. The Table also shows the performance results of a second carbon black product having an adsorbed compound. The untreated carbon black reference has a low PAH content.

TABLE XXV

| Example | Relative maximum tan delta | Relative abrasion index at 14% slip |
|---|---|---|
| 86 | 100 | 100 |
| 53 | 87 | 171 |
| 48 | 91 | 107 |

The sample that included the modified carbon black having the adsorbed compound (Example 53) and attached organic groups of the present invention showed a substantially improved increased relative abrasion index and an improved tan delta performance relative to the untreated carbon black. The sample that included a modified carbon black having an adsorbed compound (Example 48) of the present invention showed an improved increased relative abrasion index relative to the untreated carbon black.

Table XXVI provides performance results (relative tan delta and relative abrasion indices at 14% and 21% slip) for elastomeric composites that include an unmodified carbon black (Example 29) and comparative carbon black products having an adsorbed compound.

TABLE XXVI

| Example | Relative maximum tan delta | Relative abrasion index at 14% slip |
|---|---|---|
| 29 | 100 | 100 |
| 100 (comparative) | 116 | 99 |
| 102 (comparative) | 85 | 78 |

The comparative carbon black products having an adsorbed compound had depressed abrasion index results or results similar to that of the untreated carbon black.

Table XXVII provides performance results (relative tan delta and relative abrasion indices at 14% and 21% slip for elastomeric composites that include an unmodified carbon black (Example 29) and a comparative carbon black product prepared with adsorbed compound that had been subsequently substantially removed.

TABLE XXVII

| Example | Relative maximum tan delta | Relative abrasion index at 14% slip | Relative abrasion index at 21% slip |
|---|---|---|---|
| 29 | 100 | 100 | 100 |
| 103 | 86 | 90 | 99 |

The sample that included the comparative carbon black products that no longer had an adsorbed compound did not have improved abrasion performance.

Table XXIX provides performance results (relative tan delta and relative abrasion indices at 14% slip) for elastomeric composites that include a modified carbon black product of the present invention having an adsorbed compound in comparison with an unmodified carbon black (Example 29)

TABLE XXIX

| Example | Relative maximum tan delta | Relative abrasion index at 14% slip |
|---|---|---|
| 29 | 100 | 100 |
| 99 | 89 | 135 |

The sample that included a modified carbon black having the adsorbed compound of the present invention showed an improved increased relative abrasive index and an improved tan delta value relative to the control.

For these remaining examples, Table XXXIII sets forth the formulations used. The components used in elastomer composites were mixed following a two-stage mixing in BR Banbury mixer first at a rotor speed of 80 rpm and starting temperature of 50 C followed by the addition of curatives (sulfur, BBTS) in the second stage at a rotor speed of 50 rpm and a starting temperature of 50 C. The components in first-stage mixing were mixed for a total of 6 minutes before passing through the open mill six times. The milled compound from first-stage mixing was kept at room temperature for at least 2 h before second stage mixing. The curatives were then mixed in the second stage for 2 minutes. Table XXX provides performance results (relative tan delta and relative abrasion indices at 7% and 14% slip) for natural rubber composites that include a modified carbon black product of the present invention in comparison with an unmodified carbon black (Example 29) and an unmodified silica.

TABLE XXX

| Example | Relative maximum tan delta | Relative abrasion index at 7% slip | Relative abrasion index at 14% slip |
|---|---|---|---|
| 104 | 100 | 100 | 100 |
| 105 (Silica) | 63 | 66 | 57 |
| 106 | 73 | 89 | 63 |

The modified carbon black of the present invention had a reduced and desirable tan delta index relative to the carbon black sample and an increased and desirable abrasion indicies relative to the silica. At 7% slip, the modified carbon black of the present invention was a favorable compromise between the untreated carbon black and the untreated silica.

The modified carbon black of the present invention had a reduced and desirable tan delta index relative to the carbon black sample and an abrasion index value at 7% slip similar to the control.

Table XXXII provides performance results (relative tan delta and relative abrasion indices at 7% and 14% slip) for polyisoprene composites that include a carbon black product of the present invention in comparison with an unmodified carbon black (Example 29).

TABLE XXXII

| Example | Relative maximum tan delta | Relative abrasion index at 7% slip | Relative abrasion index at 14% slip |
|---|---|---|---|
| 109 | 100 | 100 | 100 |
| 110 | 75 | 92 | 76 |

The modified carbon black of the present invention had a reduced and desirable tan delta index relative to the carbon black sample. The results for the sample comprising the modified carbon black product of the present invention is a favorable compromise between the tan delta index and the abrasion index at 7% slip.

TABLE XXXIII

| | Formulations (parts by weight): | | | | | | |
|---|---|---|---|---|---|---|---|
| Ingredients | Example 104 | Example 105 | Example 106 | Example 109 | Example 110 | Example 107 | Example 108 |
| SMR 20 natural rubber* | 100 | 100 | 100 | | | 50 | 50 |
| Natsyn 2000 polyisoprene* | | | | 100 | 100 | | |
| Buna CB24 polybutadiene* | | | | | | 50 | 50 |
| Z1165 SiO2 (from Ex. 85)* | 56 | | | | | | |
| V7H control (Example 29)* | | 50 | | 50 | | 50 | |
| Example 50* | | | 50 | | 50 | | 50 |
| Si69 (coupling agent)* | 4.48 | 4.48 | 4.48 | 4.48 | 4.48 | 4.48 | 4.48 |
| Calight RPO* | 2.5 | 2.5 | 2.5 | 2.5 | 2.5 | 2.5 | 2.5 |
| ZnO* | 5 | 5 | 5 | 5 | 5 | 5 | 5 |
| Stearic acid* | 3 | 3 | 3 | 3 | 3 | 3 | 3 |
| Agerite resin D antioxidant* | 1.5 | 1.5 | 1.5 | 1.5 | 1.5 | 1.5 | 1.5 |
| 6PPD (antioxidant)* | 1.5 | 1.5 | 1.5 | 1.5 | 1.5 | 1.5 | 1.5 |
| Akrowax5031* | 1.5 | 1.5 | 1.5 | 1.5 | 1.5 | 1.5 | 1.5 |
| Sulfur ** | 1.6 | 1.2 | 1.2 | 1.2 | 1.2 | 1.2 | 1.2 |
| BBTS ** (accelerator) | 2.0 | 1.4 | 1.8 | 1.4 | 1.8 | 1.4 | 1.8 |

*Added in Stage 1 compounding
** Added in Stage 2 compounding

Table XXXI provides performance results (relative tan delta and relative abrasion indices at 7% and 14% slip) for natural rubber/polybutadiene composites that include a modified carbon black product of the present invention in comparison with an unmodified carbon black (Example 29).

TABLE XXXI

| Example | Relative maximum tan delta | Relative abrasion index at 7% slip | Relative abrasion index at 14% slip |
|---|---|---|---|
| 107 | 100 | 100 | 100 |
| 108 | 85 | 103 | 70 |

Performance Characteristics of Elastomeric Composites Containing Functionalized Elastomer and Modified Filler The compositions of elastomeric composites which contain various functionalized elastomers and modified carbon black or carbon black product prepared according to the Examples above are shown as Examples 114, 118, 120, 122, 124, 128, 132, 133, and 134 in Tables XXXV, XXXVI, XXXVIII, XXXIX, XLI, XLII, XLIII, and XLIV below. As comparative examples shown in these tables, compositions of elastomeric composites were prepared which used an elastomer without functionalization and/or used a different type of filler in Examples 111, 112, 113, 115, 116, 117, 119, 121, 123, 125, 126, 127, 129, 130, and 131. Various properties, including hysteresis, abrasion resistance and others, were determined for the indicated examples and comparative examples of the composites. The elastomeric composites for these experiments were prepared with essentially the same two-stage compounding protocols and equipment which were described above with respect to the formulations shown in Tables A and B. The components used in for the elastomer composites (as set forth in the Tables below) were mixed following a three-stage mixing in a BR1600 Banbury mixer (Capacity 1200 ml, Farrel Corporation). The first stage involved adding the polymer and carbon black followed by the remaining ingredients except the curatives at a rotor speed of 50 rpm and starting temperature of 50 C and then raising to a temperature of 150 C, wherein the material was then milled using 4 crosscuts and 2 end rolls. The second stage followed with just mixing at a rotor speed of 80 rpm and a starting temperature of 50 C, wherein the temperature went to 150 C. The material was then milled using 4 crosscuts and 2 end rolls. Then a third stage of mixing was performed with the addition of the curatives at a rotor speed of 50 rpm and a starting temperature of 50 C, wherein the temperature went to 110 C. Again the material was then milled using 4 crosscuts and 2 end rolls.

In all examples, unless specified otherwise, numerical values represent parts by weight.

Table XXXIV shows the properties of elastomers which are styrene-butadiene rubber without carboxylic-functionalization (VSL 5025-2), and a styrene-butadiene rubber with carboxylic-functionalization (VP PBR 4003). Elastomeric compositions for Examples 111-114 were prepared with these SBRs using the fillers of Comparative Example A and Example 50.

TABLE XXXIV

| Feature of Elastomer | Elastomer | |
|---|---|---|
| | VSL 5025-2 | VP PBR 4003 |
| Producer | Lanxess | Lanxess |
| Bound Styrene Content, % | 24 | 24 |
| Vinyl Content, % | 46 | 46 |
| DSC Tg, C. | −28 | −26 |
| Functional Groups | None | COOH |
| ML (1 + 4) at 100° C. | 50 | 53 |
| COOH Content (Meq/kg) | 0 | 35 |

TABLE XXXV

| Formulation | Example | | | |
|---|---|---|---|---|
| | 111 | 112 | 113 | 114 |
| BUNA VSL 5025-2 SSBR* | 137.5 | 137.5 | | |
| BUNA VSL VP PBR4003 SSBR* | | | 137.5 | 137.5 |
| Comparative Example A* | 80 | | 80 | |
| Example 50* | | 82 | | 82 |
| Santoflex 6PPD Antioxidant* | 1 | 1 | 1 | 1 |
| MPD-100 flakes Antioxidant* | 1 | 1 | 1 | 1 |
| Sunproof Waxes* | 2.5 | 2.5 | 2.5 | 2.5 |
| ZnO* | 3 | 3 | 3 | 3 |
| Stearic Acid* | 2 | 2 | 2 | 2 |
| Santocure CBS** | 1.1 | 1.9 | 1.1 | 1.9 |
| Diphenylguanidine (DPG)** | 0.3 | 0.5 | 0.3 | 0.5 |
| Sulfur** | 1.4 | 1.4 | 1.4 | 1.4 |
| TOTAL | 229.8 | 232.8 | 229.8 | 232.8 |

*Added in Stage 1 compounding
**Added in Stage 3 compounding

Table XXXVI shows selected compounding ingredients and provides performance results for the elastomeric composition of Example 114 that includes a functionalized elastomer and a modified carbon black product of the present invention in comparison with compositions of Examples 111-113 which contain a different filler and/or non-functionalized elastomer.

TABLE XXXVI

| Elastomer Type | VSL 5025-2 | | VP PBR 4003 | |
|---|---|---|---|---|
| Example | 111 | 112 | 113 | 114 |
| BUNA VSL 5025-2 SSBR | 137.5 | 137.5 | | |
| BUNA VSL VP PBR4003 SSBR | | | 137.5 | 137.5 |
| Comparative example A | 80 | | 80 | |
| Example 50 | | 82 | | 82 |
| Tensile | | | | |
| 100% Modulus, MPa | 2.50 | 3.07 | 3.75 | 3.37 |
| 300% Modulus, MPa | 9.75 | 10.82 | 13.98 | 15.08 |
| Tensile Strength, MPa | 17.67 | 16.31 | 19.21 | 18.90 |
| Elongation at Break, % | 524 | 375 | 428 | 377 |
| Shore A Hardness | | | | |
| Shore A Hardness at 23° C. | 72 | 75 | 71 | 72 |
| Shore A Hardness at 70° C. | 59 | 65 | 60 | 64 |
| Rebound | | | | |
| Rebound at 23° C. | 13.0 | 14.9 | 15.0 | 16.0 |
| Rebound at 70° C. | 30.7 | 35.2 | 38.8 | 40.8 |
| Abrasion Resistance | | | | |
| 14% Slip, % | 131 | 174 | 94 | 140 |
| Dynamical-Strain Sweep | | | | |
| G' at 0.1% and 70° C. | 7.82 | 9.53 | 5.18 | 6.49 |
| G' at 50% and 70° C. | 1.38 | 1.06 | 1.02 | 1.02 |
| tan delta max at 70° C. | 0.368 | 0.325 | 0.279 | 0.278 |
| Dynamical-Temperature Sweep | | | | |
| G' at 70° C., MPa | 2.73 | 3.50 | 2.09 | 2.64 |
| tan delta at 70° C. | 0.345 | 0.324 | 0.276 | 0.265 |

The sample of Example 114 that includes a functionalized elastomer and a modified carbon black product of the present invention showed an improvement (reduction) in high temperature hysteresis, rebound at high temperatures and tensile modulus at 300% elongation.

Table XXXVII shows the properties of styrene-butadiene elastomers without aminosilane-functionalization (PBR4041), and with aminosilane-functionalization (HPR355), or with tin-coupled functionalization (Duradene™ 739), or with hydroxyl functionalization (NS-612), or with amine-functionalization (SLR4601). Elastomeric compositions for Examples 115-124 were prepared with these SBRs using the different fillers as indicated in Table XXXVIII. The filler ingredients are the same as those used in the preceding Examples 111-114.

TABLE XXXVII

| Feature of Elastomer | Elastomer | | | | |
|---|---|---|---|---|---|
| | PBR4041 | HPR355 | Duradene 739 | NS-612 | SLR4601 |
| Producer | Lanxess | JSR | Firestone | Zeon Chemical | Styron |
| Bound Styrene Content, % | 25 | 27 | 20 | 15 | 21 |
| Vinyl Content, % | 42 | 57 | 60 | 30 | 63 |
| DSC Tg, C. | −20 | −25 | −34 | −65 | −25 |
| Functional Groups | None | Aminosilane | Tin-Coupled | Hydroxyl | Amine |
| ML (1 + 4) at 100° C., MU | 65 | 46 | 93 | — | 50 |

TABLE XXXVIII

| Formulation | Example | | | | | | | | | |
|---|---|---|---|---|---|---|---|---|---|---|
| | 115 | 116 | 117 | 118 | 119 | 120 | 121 | 122 | 123 | 124 |
| VSL VP PBR4041 SSBR* | 100 | 100 | | | | | | | | |
| HPR355 SSBR* | | | 100 | 100 | | | | | | |
| Duradene 739 SSBR* | | | | | 100 | 100 | | | | |
| NS-612 SSBR* | | | | | | | 100 | 100 | | |
| SLR4601 SSBR* | | | | | | | | | 100 | 100 |
| Comparative Example A* | 50 | | 50 | | 50 | | 50 | | 50 | |
| Example 50* | | 50 | | 50 | | 50 | | 50 | | 50 |
| Santoflex 6PPD Antioxidant* | 1 | 1 | 1 | 1 | 1 | 1 | 1 | 1 | 1 | 1 |
| MPD-100 flakes Antioxidant* | 1 | 1 | 1 | 1 | 1 | 1 | 1 | 1 | 1 | 1 |
| Sunproof Waxes* | 2.5 | 2.5 | 2.5 | 2.5 | 2.5 | 2.5 | 2.5 | 2.5 | 2.5 | 2.5 |
| ZnO* | 3 | 3 | 3 | 3 | 3 | 3 | 3 | 3 | 3 | 3 |
| Stearic Acid* | 2 | 2 | 2 | 2 | 2 | 2 | 2 | 2 | 2 | 2 |
| Santocure CBS** | 1.1 | 1.9 | 1.1 | 1.9 | 1.1 | 1.9 | 1.1 | 1.9 | 1.1 | 1.9 |
| Sulfur** | 1.4 | 1.4 | 1.4 | 1.4 | 1.4 | 1.4 | 1.4 | 1.4 | 1.4 | 1.4 |
| TOTAL | 162.0 | 162.8 | 162.0 | 162.8 | 162.0 | 162.8 | 162.0 | 162.8 | 162.0 | 162.8 |

*Added in Stage 1 compounding
**Added in Stage 3 compounding

Table XXXIX shows selected compounding ingredients and provides performance results for the elastomeric compositions of Examples 118, 120, 122, and 124 that include a functionalized elastomer and a modified carbon black product of the present invention in comparison with compositions of Examples 115, 116, 117, 118, 121, and 123 which contain different filler and/or non-functionalized elastomer.

TABLE XXXIX

| Elastomer Type | PBR4041 | | HPR356 | | Duradene739 | | NS-612 | | SLR4601 | |
|---|---|---|---|---|---|---|---|---|---|---|
| Example | 115 | 116 | 117 | 118 | 119 | 120 | 121 | 122 | 123 | 124 |
| Compound Features | | | | | | | | | | |
| BUNA VSL VP PBR4041 SSBR | 100 | 100 | | | | | | | | |
| HPR355 SSBR | | | 100 | 100 | | | | | | |
| Duradene 739 SSBR | | | | | 100 | 100 | | | | |
| NS-612 SSBR | | | | | | | 100 | 100 | | |
| SLR 4601 SSBR | | | | | | | | | 100 | 100 |
| Comparative Example A | 50 | | 50 | | 50 | | 50 | | 50 | |
| Example 50 | | 50 | | 50 | | 50 | | 50 | | 50 |
| Bound Rubber | | | | | | | | | | |
| Bound Rubber % | 32 | 38 | 46 | 47 | 35 | 40 | 28 | 36 | 35 | 49 |
| Tensile | | | | | | | | | | |
| 100% Modulus, MPa | 3.13 | 3.47 | 2.82 | 3.15 | 2.78 | 3.09 | 2.53 | 2.65 | 2.77 | 3.01 |
| 300% Modulus, MPa | 13.56 | 16.97 | 13.69 | 17.43 | 12.33 | 15.61 | 10.52 | 11.54 | 12.61 | 16.88 |
| Tensile Strength, MPa | 21.20 | 22.89 | 23.47 | 23.79 | 22.43 | 20.61 | 24.32 | 19.35 | 22.42 | 19.66 |
| Elongation at Break, % | 426 | 371 | 451 | 381 | 473 | 357 | 545 | 438 | 465 | 324 |

TABLE XXXIX-continued

| Elastomer Type | PBR4041 | | HPR356 | | Duradene739 | | NS-612 | | SLR4601 | |
|---|---|---|---|---|---|---|---|---|---|---|
| Example | 115 | 116 | 117 | 118 | 119 | 120 | 121 | 122 | 123 | 124 |
| Shore A Hardness | | | | | | | | | | |
| Shore A Hardness at 23° C. | 72 | 68 | 67 | 66 | 66 | 69 | 68 | 68 | 68 | 65 |
| Shore A Hardness at 70° C. | 62 | 63 | 60 | 62 | 62 | 64 | 64 | 64 | 63 | 62 |
| Rebound | | | | | | | | | | |
| Rebound at 23° C. | 12.5 | 12.7 | 22.0 | 23.8 | 26.8 | 30.6 | 49.3 | 56.0 | 22.6 | 24.4 |
| Rebound at 70° C. | 48.7 | 51.4 | 56.4 | 62.3 | 54.2 | 61.9 | 58.6 | 63.0 | 56.5 | 65.3 |
| Abrasion Resistance | | | | | | | | | | |
| 14% Slip, % | 167 | 269 | 142 | 249 | 134 | 219 | 77 | 84 | 138 | 267 |
| Dynamical-Strain Sweep | | | | | | | | | | |
| G' at 0.1% and 70° C. | 4.95 | 4.60 | 3.51 | 2.63 | 5.41 | 3.75 | 5.39 | 4.52 | 5.17 | 2.83 |
| G' at 50% and 70° C. | 1.24 | 1.25 | 1.31 | 1.24 | 1.40 | 1.29 | 1.61 | 1.58 | 1.38 | 1.33 |
| tan delta max at 70° C. | 0.239 | 0.220 | 0.189 | 0.148 | 0.217 | 0.178 | 0.185 | 0.183 | 0.225 | 0.146 |
| Dynamical-Temperature Sweep | | | | | | | | | | |
| G' at 70° C., MPa | 2.23 | 2.77 | 2.08 | 2.00 | 2.69 | 2.41 | 3.48 | 2.53 | 2.92 | 2.15 |
| tan delta at 70° C. | 0.216 | 0.213 | 0.180 | 0.138 | 0.203 | 0.167 | 0.183 | 0.211 | 0.227 | 0.157 |

The samples of Examples 118, 120, 122, and 124 that include a functionalized elastomer and a modified carbon black product of the present invention showed, for example, a reduction in high temperature hysteresis and an increase in rebound at high temperatures from use of the tin-coupled styrene-butadiene and reduction in high temperature hysteresis and an increase in rebound at high temperatures from the use of the aminosilane-functionalized and amine-functionalized styrene-butadiene rubbers.

Table XL shows the properties of a natural rubber without functionalization (SMR20) and with epoxy-functionalization (ENR25). Elastomeric compositions for Examples 125-128 were prepared with these elastomers using the different fillers as indicated in Table XLI. The filler ingredients are the same as those used in the preceding Examples 111-124.

TABLE XL

| | Elastomer | |
|---|---|---|
| Feature of Elastomer | SMR20 NR | ENR-25 |
| Producer | — | Ekoprena |
| DSC Tg, ° C. | −65 | −45 |
| Functional Groups | None | Epoxy |

TABLE XLI

| | Example | | | |
|---|---|---|---|---|
| Formulation | 125 | 126 | 127 | 128 |
| SMR 20 NR* | 100 | 100 | | |
| Ekoprena 25 ENR* | | | 100 | 100 |
| Comparative Example A* | 50 | | 50 | |
| Example 50* | | 50 | | 50 |
| Santoflex 6PPD Antioxidant* | 1 | 1 | 1 | 1 |
| MPD-100 flakes Antioxidant* | 1 | 1 | 1 | 1 |
| Sunproof Waxes* | 2.5 | 2.5 | 2.5 | 2.5 |
| ZnO* | 5 | 5 | 5 | 5 |
| Stearic Acid* | 3 | 3 | 3 | 3 |

TABLE XLI-continued

| | Example | | | |
|---|---|---|---|---|
| Formulation | 125 | 126 | 127 | 128 |
| TBBS** | 1.4 | 1.8 | 1.4 | 1.8 |
| Sulfur** | 1.2 | 1.4 | 1.2 | 1.4 |
| TOTAL | 165.1 | 165.7 | 165.1 | 165.7 |

*Added in Stage 1 compounding
**Added in Stage 3 compounding

Table XLII shows selected compounding ingredients and provides performance results for the elastomeric composition of Example 128 that includes a functionalized elastomer and a modified carbon black product of the present invention in comparison with compositions of Examples 125-127 which contain different filler and/or non-functionalized elastomer.

TABLE XLII

| Elastomer Type | NR | | ENR-25 | |
|---|---|---|---|---|
| Example | 125 | 126 | 127 | 128 |
| Compound Features | | | | |
| SMR 20 NR | 100 | 100 | | |
| Ekoprena 25 ENR | | | 100 | 100 |
| Comparative Example A | 50 | | 50 | |
| Example 50 | | 50 | | 50 |
| Bound Rubber | | | | |
| Bound Rubber % | 50 | 55 | 44 | 51 |
| Tensile | | | | |
| 100% Modulus, MPa | 2.58 | 2.92 | 3.20 | 3.20 |
| 300% Modulus, MPa | 13.91 | 15.25 | 16.17 | 16.56 |
| Tensile Strength, MPa | 29.95 | 28.92 | 30.49 | 24.29 |
| Elongation at Break, % | 539 | 506 | 513 | 401 |
| Shore A Hardness | | | | |
| Shore A Hardness at 23° C. | 65 | 63 | 68 | 62 |
| Shore A Hardness at 70° C. | 60 | 60 | 61 | 55 |
| Rebound | | | | |
| Rebound at 23° C. | 50.5 | 57.8 | 30.9 | 33.3 |
| Rebound at 70° C. | 63.9 | 71.4 | 55.6 | 59.0 |

TABLE XLII-continued

| Elastomer Type | NR | | ENR-25 | |
|---|---|---|---|---|
| Example | 125 | 126 | 127 | 128 |
| Abrasion Resistance | | | | |
| 14% Slip, % | 66 | 46 | 118 | 151 |
| Dynamical-Strain Sweep | | | | |
| G' at 0.1% and 70° C. | 5.91 | 4.29 | 5.92 | 2.83 |
| G' at 50% and 70° C. | 1.22 | 1.29 | 1.28 | 1.12 |
| tan delta max at 70° C. | 0.194 | 0.136 | 0.215 | 0.175 |
| Dynamical-Temperature Sweep | | | | |
| G' at 70° C., MPa | 3.16 | 2.68 | 2.99 | 1.84 |
| tan delta at 70° C. | 0.186 | 0.140 | 0.227 | 0.159 |

The sample of Example 128 that includes a functionalized elastomer and a modified carbon black product of the present invention showed a reduced hysteresis at high temperatures from use of the epoxidized natural rubber.

Table XLIII shows the elastomeric compositions of Examples 129-134 which were prepared with styrene-butadiene rubber (Duradene™ 739) with tin coupled-functionalization using the same filler ingredients as those used in the preceding Examples 111-128.

TABLE XLIII

| | Example | | | | | |
|---|---|---|---|---|---|---|
| Formulation | 129 | 130 | 131 | 132 | 133 | 134 |
| Duradene 739 SSBR* | 100 | 100 | 100 | 100 | 100 | 100 |
| Comparative Example A* | 90 | 70 | 50 | | | |
| Example 50* | | | | 90 | 70 | 50 |
| VivaTec 500 Oil* | 50 | 25 | | 50 | 25 | |
| Santoflex 6PPD Antioxidant* | 1 | 1 | 1 | 1 | 1 | 1 |
| MPD-100 flakes Antioxidant* | 1 | 1 | 1 | 1 | 1 | 1 |
| Sunproof Waxes* | 2.5 | 2.5 | 2.5 | 2.5 | 2.5 | 2.5 |
| ZnO* | 3 | 3 | 3 | 3 | 3 | 3 |
| Stearic Acid* | 2 | 2 | 2 | 2 | 2 | 2 |
| Santocure CBS** | 1.10 | 1.10 | 1.10 | 1.90 | 1.75 | 1.60 |
| DPG** | 0.3 | 0.3 | 0.3 | | | |
| TBZTD** | | | | 0.5 | 0.5 | 0.5 |
| Sulfur** | 1.4 | 1.4 | 1.4 | 1.6 | 1.6 | 1.6 |
| TOTAL | 252.3 | 207.3 | 162.3 | 253.5 | 208.4 | 163.2 |

*Added in Stage 1 compounding
**Added in Stage 3 compounding

Table XLIV shows selected compounding ingredients and provides performance results for the elastomeric composition of Examples 132-134 that include a functionalized elastomer and a modified carbon black product of the present invention in comparison with compositions of Examples 129-131 which contain different filler.

TABLE XLIV

| Elastomer Filler Type | Comparative Example A | | | Example 50 | | |
|---|---|---|---|---|---|---|
| Example | 129 | 130 | 131 | 132 | 133 | 134 |
| Compound Features | | | | | | |
| Duradene 739 SSBR | 100 | 100 | 100 | 100 | 100 | 100 |
| Comparative Example A | 90 | 70 | 50 | | | |
| Example 50 | | | | 90 | 70 | 50 |
| Bound Rubber | | | | | | |
| Bound Rubber % | 42 | 37 | 35 | 53 | 52 | 46 |
| Tensile | | | | | | |
| 100% Modulus, MPa | 1.68 | 2.07 | 2.54 | 2.02 | 2.77 | 2.95 |
| 300% Modulus, MPa | 6.74 | 8.85 | 11.82 | 9.42 | 14.10 | 16.42 |
| Tensile Strength, MPa | 14.30 | 18.77 | 20.84 | 14.42 | 18.26 | 18.31 |
| Elongation at Break, % | 580 | 567 | 468 | 421 | 370 | 324 |
| Shore A Hardness | | | | | | |
| Shore A Hardness at 23° C. | 65 | 67 | 68 | 63 | 65 | 66 |
| Shore A Hardness at 70° C. | 56 | 59 | 62 | 55 | 59 | 61 |
| Rebound | | | | | | |
| Rebound at 23° C. | 20.1 | 23.3 | 28.4 | 24.9 | 28.2 | 31.8 |
| Rebound at 70° C. | 36.5 | 44.3 | 56.2 | 45.2 | 53.2 | 64.5 |
| Abrasion Resistance | | | | | | |
| 14% Slip, % | 103 | 150 | 149 | 152 | 189 | 271 |
| Dynamical-Strain Sweep | | | | | | |
| G' at 0.1% and 70° C. | 7.24 | 7.60 | 4.99 | 5.19 | 5.13 | 2.66 |
| G' at 50% and 70° C. | 0.88 | 1.15 | 1.40 | 0.92 | 1.24 | 1.36 |
| tan delta max at 70°C | 0.353 | 0.302 | 0.212 | 0.284 | 0.230 | 0.131 |
| Dynamical-Temperature Sweep | | | | | | |
| G' at 70° C., MPa | 2.77 | 3.17 | 2.70 | 2.01 | 2.22 | 2.08 |
| tan delta at 70° C. | 0.350 | 0.316 | 0.217 | 0.275 | 0.258 | 0.132 |

The samples of Examples 132-134 that include a functionalized elastomer and a modified carbon black product of the present invention showed improvements in hysteresis properties, 300% modulus and abrasion properties over the whole loading range.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An elastomeric composition comprising at least one functionalized elastomer and at least one modified filler, wherein the modified filler comprises a filler having adsorbed thereon prior to contacting the modified filler with the functionalized elastomer:
   a) at least one triazole;
   b) at least one pyrazole; or
   any combination thereof, wherein said modified filler improves abrasion resistance when present in the elastomeric composition compared to said filler that is not modified, wherein said filler is carbon black and said carbon black is present in the elastomeric composition in an amount of at least 40 phr.

2. The elastomeric composition of claim 1, wherein a) or b) include a sulfur-containing substituent.

3. An elastomeric composition comprising at least one functionalized elastomer and at least one modified filler, wherein the modified filler comprises a filler having adsorbed thereon a triazole comprising formula (I) or formula (II):

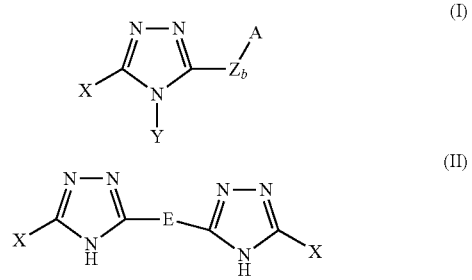

or tautomers thereof;
wherein $Z_b$ is an alkylene group, where b is 0 or 1;
X, which is the same or different, is H, $NH_2$, SH, $NHNH_2$, CHO, COOR, COOH, $CONR_2$, CN, $CH_3$, OH, NDD', or $CF_3$;
Y is H, or $NH_2$;
A is a functional group that is $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;
where R and R', which are the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;
k is an integer from 1 to 8 when R is H and otherwise k is 2 to 8;
Q is $(CH_2)_w$, $(CH2)_xO(CH_2)_z$, $(CH_2)_xNR(CH_2)_z$, or $(CH_2)_x S(CH_2)_z$, where x is 1 to 6, z is 1 to 6, and w is 2 to 6;
E is a polysulfur-containing group; and
said triazole comprising formula (II) is optionally N-substituted with an NDD' substituent, where
D and D', which are the same or different, are H or $C_1$-$C_4$ alkyl.

4. The elastomeric composition of claim 3, wherein the functionalized elastomer comprises a diene elastomer that is a copolymer of a diene and a vinyl aromatic compound, a copolymer of a diene and at least one alpha-olefin, polyisoprene, polybutadiene, chloroprene, polyisoprene, a copolymer of butadiene and isoprene, a copolymer of isobutylene and isoprene, a terpolymer of butadiene, a vinyl aromatic compound, and isoprene, or any combination thereof.

5. The elastomeric composition of claim 3, wherein the functionalized elastomer is amine-functionalized, silane-functionalized, aminosilane-functionalized, mercaptosilane-functionalized, hydroxyl-functionalized, carboxylic-functionalized, epoxy-functionalized, tin-coupled, or any combination thereof.

6. The elastomeric composition of claim 3, wherein the functionalized elastomer is an amine-functionalized styrene-butadiene rubber, silane-functionalized styrene-butadiene rubber, aminosilane-functionalized styrene-butadiene rubber, mercaptosilane-functionalized styrene-butadiene rubber, hydroxyl-functionalized styrene-butadiene rubber, carboxylic-functionalized styrene-butadiene rubber, epoxy-functionalized styrene-butadiene rubber, tin-coupled styrene-butadiene rubber, or any combination thereof.

7. The elastomeric composition of claim 3, wherein said triazole comprises:

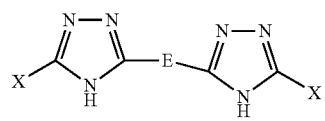

or tautomers thereof, and
E is $S_w$, where w is 2 to 8, SSO, $SSO_2$, $SOSO_2$, $SO_2SO_2$.

8. The elastomeric composition of claim 3, wherein said triazole comprises:

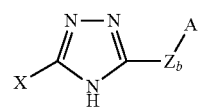

or tautomers thereof.

9. The elastomeric composition of claim 3, wherein said triazole is:

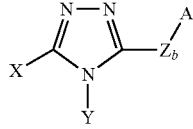

or tautomers thereof, and
wherein Y is $NH_2$.

10. The elastomeric composition of claim 3, wherein said filler has adsorbed thereon: 3-amino-1,2,4-triazole-5-thiol, 3-amino-1,2,4-triazol-5-yl disulfide, 1,2,4-triazole-3-thiol, or 1,2,4-triazol-3-yl disulfide, or any combination thereof.

11. The elastomeric composition of claim 3, further comprising at least one chemical group attached to said filler.

12. The elastomeric composition of claim 11, wherein said chemical group comprises:
a) at least one triazole;
b) at least one pyrazole;
c) at least one imidazole; or
any combinations thereof.

13. The elastomeric composition of claim 12, wherein said chemical group attached to said filler comprises the at least one triazole, the at least one triazole comprising:

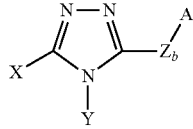

or tautomers thereof;
wherein $Z_b$ is an alkylene group, where b is 0 or 1;
X comprises a bond to the filler;
Y is H, alkyl, aryl, or $NH_2$;
A is a functional group that is $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;
where R and R', which are the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;
k is an integer from 1 to 8; and
Q is $(CH_2)_w$, $(CH2)_xO(CH_2)_z$, $(CH_2)_xNR(CH_2)_z$, or $(CH_2)_x S(CH_2)_z$, where x is 1 to 6, z is 1 to 6, and w is 2 to 6.

14. The elastomeric composition of claim 13, wherein said filler is at least one metal oxide and said X comprising a bond to the filler is through at least one silane linker group.

15. The elastomeric composition of claim 13, wherein said filler is at least one metal oxide and said X comprising a bond to the filler is through at least one Si-containing group, Ti-containing group, Cr-containing group, or a Zr-containing group.

16. The elastomeric composition of claim 12, wherein said chemical group attached to said filler comprises the at least one triazole, the at least one triazole comprising:

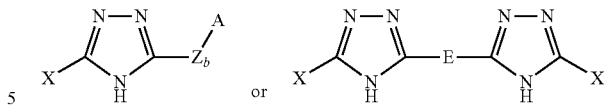

or tautomers thereof;
wherein $Z_b$ is an alkylene group, where b is 0 or 1;
at least one X comprises a bond to the filler, and any remaining X comprises a bond to the filler or a functional group;
A is a functional group that is $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;
where R and R', which are the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;
k is an integer from 1 to 8 when R is H and otherwise k is 2 to 8;
Q is $(CH_2)_w$, $(CH2)_xO(CH_2)_z$, $(CH_2)_xNR(CH_2)_z$, or $(CH_2)_x S(CH_2)_z$, where x is 1 to 6, z is 1 to 6, and w is 2 to 6;
E is a polysulfur-containing radical; and
said triazole is optionally N-substituted with an NDD' substituent, where
D and D', which are the same or different, are H or $C_1$-$C_4$ alkyl.

17. The elastomeric composition of claim 11, wherein said chemical group comprises an alkyl group or aromatic group having at least functional group that is R, OR, COR, COOR, OCOR, a carboxylate salt, halogen, CN, $NR_2$, $SO_3H$, a sulfonate salt, NR(COR), $CONR_2$, $NO_2$, $PO_3H_2$, a phosphonate salt, a phosphate salt N=NR, $NR_3^+X^-$, $PR_3^+X^-$, $S_kR$, $SSO_3H$, a $SSO_3^-$ salt, $SO_2NRR'$, $SO_2SR$, SNRR', SNQ, $SO_2NQ$, $CO_2NQ$, S-(1,4-piperazinediyl)-SR, 2-(1,3-dithianyl) 2-(1,3-dithiolanyl), SOR, or $SO_2R$, wherein R and R', which are the same or different, are independently hydrogen, branched or unbranched $C_1$-$C_{12}$ substituted or unsubstituted, saturated or unsaturated hydrocarbon, and k is an integer that ranges from 1-8, and $X^-$ is a halide or an anion derived from a mineral or organic acid, Q is $(CH_2)_w$, $(CH_2)_xO(CH_2)_z$, $(CH_2)_xNR(CH_2)_z$, or $(CH_2)_xS(CH_2)_z$, where w is an integer from 2 to 6 and x and z are independently integers from 1 to 6.

18. The elastomeric composition of claim 11, wherein said chemical group comprises an aromatic group having a formula AyAr—, wherein Ar is an aromatic radical and A is R, OR, COR, COOR, OCOR, a carboxylate salt, halogen, CN, $NR_2$, $SO_3H$, a sulfonate salt, NR(COR), $CONR_2$, $NO_2$, $PO_3H_2$, a phosphonate salt, a phosphate salt N=NR, $NR_3^+X^-$, $PR_3^+X^-$, $S_kR$, $SSO_3H$, a $SSO_3^-$ salt, $SO_2NRR'$, $SO_2SR$, SNRR', SNQ, $SO_2NQ$, $CO_2NQ$, S-(1,4-piperazinediyl)-SR, 2-(1,3-dithianyl) 2-(1,3-dithiolanyl), SOR, or $SO_2R$, wherein R and R', which are the same or different, are independently hydrogen, branched or unbranched $C_1$-$C_{100}$ substituted or unsubstituted, saturated or unsaturated hydrocarbon, and k is an integer that ranges from 1-8, and $X^-$ is a halide or an anion derived from a mineral or organic acid, Q is $(CH_2)_w$, $(CH_2)_xO(CH_2)_z$, $(CH_2)_xNR(CH_2)_z$, or $(CH_2)_x$ $S(CH_2)_z$, where w is an integer from 2 to 6 and x and z are independently integers from 1 to 6, and y is an integer from 1 to the total number of —CH radicals in the aromatic radical.

19. The elastomeric composition of claim 18, wherein said Ar comprises a triazole group.

20. The elastomeric composition of claim 18, wherein said Ar comprises a pyrazole group.

21. The elastomeric composition of claim 18, wherein said Ar comprises an imidazole group.

22. The elastomeric composition of claim 11, wherein said chemical group is at least one aminomethylphenyl group.

23. The elastomeric composition of claim 11, wherein said chemical group is $X-C_6H_4-S-S-C_6H_4-X$, where at least one X is a bond to the filler and the other X is a bond to the filler or a functional group.

24. The elastomeric composition of claim 11, wherein said chemical group comprises at least one aromatic sulfide or polysulfide.

25. The elastomeric composition of claim 11, wherein said modified filler improves abrasion resistance in the elastomeric composition compared to said filler that is not modified and improves (decreases) hysteresis in said elastomeric composition compared to said filler that is unmodified.

26. The elastomeric composition of claim 25, wherein said hysteresis is improved (decreased) by at least 5%.

27. The elastomeric composition of claim 25, wherein said hysteresis is improved (decreased) by at least 20%.

28. The elastomeric composition of claim 25, wherein said abrasion resistance is increased by at least 10% and said hysteresis is improved (decreased) by at least 5%.

29. The elastomeric composition of claim 25, wherein said abrasion resistance is increased by at least 50% and said hysteresis is improved (decreased) by at least 10%.

30. The elastomeric composition of claim 11, wherein the modified filler having an attached amount of from 0.1 to 6 moles/m² filler surface.

31. The elastomeric composition of claim 3, wherein the modified filler has an adsorbed amount of from 0.01 to 10 micromoles of heterocyclic groups/m² surface area of filler.

32. The elastomeric composition of claim 3, wherein said modified filler improves abrasion resistance in the elastomeric composition compared to said filler that is not modified.

33. The elastomeric composition of claim 32, wherein said abrasion resistance is increased by at least 10%.

34. The elastomeric composition of claim 32, wherein said abrasion resistance is increased by at least 50%.

35. The elastomeric composition of claim 3, wherein said filler is carbon black, silicon-treated carbon black, silicon-coated carbon black, or a metal oxide.

36. An article of manufacture comprising the elastomeric composition of claim 3.

37. The article of claim 36, wherein said article is a tire or a component thereof.

38. The article of claim 36, wherein said article is a tire tread or tire sidewall.

39. An elastomeric composition comprising at least one functionalized elastomer and at least one modified filler, wherein the modified filler comprises a filler having attached thereon a triazole comprising:

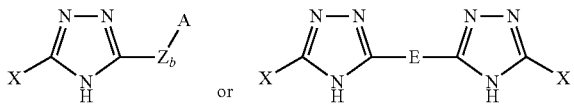

or tautomers thereof, wherein
wherein $Z_b$ is an alkylene group, where b is 0 or 1;
at least one X comprises a bond to the filler and any remaining X comprises a bond to the filler or a functional group;
A is a functional group that is $S_kR$, $SSO_3H$, $SO_2NRR'$, $SO_2SR$, $SNRR'$, $SNQ$, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;
where R and R', which can be the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;
k is an integer from 1 to 8;
Q is $(CH_2)_w$, $(CH2)_xO(CH_2)_z$, $(CH_2)_xNR(CH_2)_z$, or $(CH_2)_x S(CH_2)_z$, where x is 1 to 6, z is 1 to 6, and w is 2 to 6;
E is a polysulfur-containing radical; and
said triazole is optionally N-substituted with an NDD' substituent, where
D and D', which are the same or different, are H or $C_1$-$C_4$ alkyl.

40. The elastomeric composition of claim 39, wherein said triazole is:

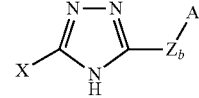

or tautomers thereof.

41. The elastomeric composition of claim 39, wherein said triazole is:

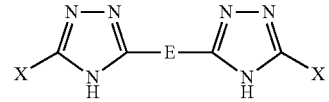

or tautomers thereof.

42. The elastomeric composition of claim 39, wherein said modified filler improves hysteresis in the elastomeric composition compared to said filler that is unmodified.

43. The elastomeric composition of claim 42, wherein said hysteresis is decreased by at least 5%.

44. The elastomeric composition of claim 42, wherein said hysteresis is decreased by at least 20%.

45. A method to increase abrasion resistance, decrease hysteresis, or both, in an elastomeric composition comprising introducing at least one modified filler into said elastomeric composition prior to curing, wherein the modified filler comprises a filler having adsorbed thereon a triazole comprising:

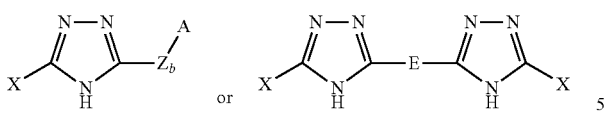

or tautomers thereof;

wherein $Z_b$ is an alkylene group, where b is 0 or 1;

X, which is the same or different, is H, $NH_2$, SH, $NHNH_2$, CHO, COOR, COOH, $CONR_2$, CN, $CH_3$, OH, NDD', or $CF_3$;

A is a functional group that is $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;

where R and R', which are the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8 when R is H and otherwise k is 2 to 8;

Q is $(CH_2)_w$, $(CH2)_xO(CH_2)_z$, $(CH_2)_xNR(CH_2)_z$, or $(CH_2)_x S(CH_2)_z$, where x is 1 to 6, z is 1 to 6, and w is 2 to 6;

E is a polysulfur-containing group; and said triazole is optionally N-substituted with an NDD' substituent, where D and D', which are the same or different, are H or $C_1$-$C_4$ alkyl.

* * * * *